(12) United States Patent (10) Patent No.: US 8,612,207 B2
Sakao et al. (45) Date of Patent: Dec. 17, 2013

(54) TEXT MINING DEVICE, METHOD THEREOF, AND PROGRAM

(75) Inventors: Yousuke Sakao, Tokyo (JP); Kenji Satoh, Tokyo (JP); Susumu Akamine, Tokyo (JP)

(73) Assignee: NEC Corporation, Tokyo (JP)

( * ) Notice: Subject to any disclaimer, the term of this patent is extended or adjusted under 35 U.S.C. 154(b) by 1283 days.

(21) Appl. No.: 10/593,375

(22) PCT Filed: Mar. 17, 2005

(86) PCT No.: PCT/JP2005/005440
§ 371 (c)(1),
(2), (4) Date: Feb. 26, 2007

(87) PCT Pub. No.: WO2005/091170
PCT Pub. Date: Sep. 29, 2005

(65) Prior Publication Data
US 2007/0233458 A1 Oct. 4, 2007

(30) Foreign Application Priority Data

Mar. 18, 2004 (JP) .................................. 2004-079077

(51) Int. Cl.
*G06F 17/27* (2006.01)
(52) U.S. Cl.
USPC ............ 704/9; 704/260; 704/2; 704/1; 704/6; 704/10; 704/235; 704/270; 704/7; 704/246; 704/251; 704/255; 704/257; 715/234; 715/260; 715/273; 714/37; 709/206; 707/741
(58) Field of Classification Search
USPC ............... 704/2, 9, 260, 1, 6, 10, 235, 270, 7, 704/246, 251, 255, 257; 714/37; 715/234, 715/260, 273; 709/206; 707/741
See application file for complete search history.

(56) References Cited

U.S. PATENT DOCUMENTS 5,111,398 A * 5/1992 Nunberg et al. .................. 704/9
5,170,349 A * 12/1992 Yagisawa et al. ................. 704/9

(Continued)

FOREIGN PATENT DOCUMENTS

JP 4-218872 8/1992
JP 10-198697 7/1998

(Continued)

OTHER PUBLICATIONS

Tatsuya Asai, et al., "Efficient Substructure Discovery from Large Semi-Structured Data", Proc. Of 2$^{nd}$ SIAM International Conf. On Data Mining, SDM2002, Apr. 2002.

(Continued)

*Primary Examiner* — Michael Colucci
(74) *Attorney, Agent, or Firm* — Scully, Scott, Murphy & Presser PC

(57) ABSTRACT

Language analysis means 21 analyzes texts read from a text DB 11, and generates a sentence structure as the analysis result. Similar-structure generation adjustment means 25 generates, from an input of an input device, a determination item for determining whether or not the structures are identical every type of differences between the sentence structures. Similar-structure determination adjustment means 26 generates, from an input of the input device 6, a determination item for determining whether or not the difference between attribute values is ignored every type of attribute values. Similar-structure generating means 22 generates a similar structure of a partial structure forming the sentence structure obtained by language analysis means 21 in accordance with the determination item from the similar-structure generation adjustment means 25, and sets the generated similar structure as an equivalent class of the partial structure on the generation source. Frequent-similar-pattern detection means 24 ignores the attribute value in accordance with the determination item given from the similar-structure determination adjustment means 26, detects the frequent pattern on the basis of a set of equivalent classes from the similar-structure generating means 22, and outputs the frequent pattern to an output device 3.

16 Claims, 23 Drawing Sheets

(56) References Cited

U.S. PATENT DOCUMENTS

| | | | |
|---|---|---|---|
| 5,424,947 A * | 6/1995 | Nagao et al. | 704/9 |
| 5,799,268 A * | 8/1998 | Boguraev | 704/9 |
| 5,960,384 A * | 9/1999 | Brash | 704/9 |
| 6,272,455 B1 * | 8/2001 | Hoshen et al. | 704/1 |
| 6,278,967 B1 * | 8/2001 | Akers et al. | 704/2 |
| 6,499,026 B1 * | 12/2002 | Rivette et al. | 1/1 |
| 6,741,988 B1 * | 5/2004 | Wakefield et al. | 707/741 |
| 7,051,022 B1 * | 5/2006 | Faisal | 1/1 |
| 7,146,308 B2 * | 12/2006 | Lin et al. | 704/9 |
| 7,523,126 B2 * | 4/2009 | Rivette et al. | 1/1 |
| 2003/0004942 A1 * | 1/2003 | Bird | 707/3 |
| 2003/0163537 A1 * | 8/2003 | Rohall et al. | 709/206 |
| 2003/0204496 A1 * | 10/2003 | Ray et al. | 707/3 |
| 2004/0059577 A1 * | 3/2004 | Pickering | 704/260 |
| 2004/0064447 A1 * | 4/2004 | Simske et al. | 707/5 |
| 2004/0260979 A1 * | 12/2004 | Kumai | 714/37 |

FOREIGN PATENT DOCUMENTS

| | | |
|---|---|---|
| JP | 2000-76274 | 3/2000 |
| JP | 2001-84250 | 3/2001 |
| JP | 2001-134575 | 5/2001 |
| JP | 2002-14990 | 1/2002 |

OTHER PUBLICATIONS

Taku Kudo, et al., "Test Mining Using Linguistic Information", Information Processing Society of Japan Kenkyu Hokoku, 2002-NL-148, Mar. 5, 2002, Vo. 2002, No. 20, pp. 65 to 72.

* cited by examiner

SENTENCE 1: FAST TYPE A OF VEHICLE IS CHEAP
SENTENCE 2: FAST AND CHEAP TYPE A OF VEHICLE
SENTENCE 3: HIGH-VELOCITY TYPE A OF VEHICLE THAT HAS BEEN CHEAP
FIG. 15
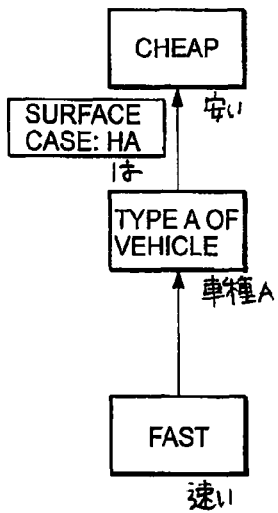
SENTENCE STRUCTURE OF SENTENCE 1:
FIG. 16A
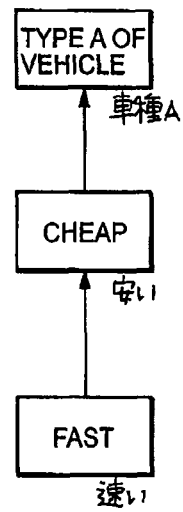
SENTENCE STRUCTURE OF SENTENCE 2:
FIG. 16B
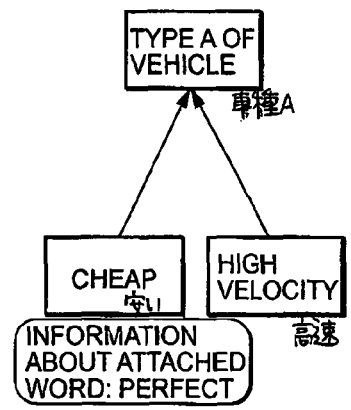
SENTENCE STRUCTURE OF SENTENCE 3:
FIG. 16C

TEXT MINING DEVICE, METHOD THEREOF, AND PROGRAM

TECHNICAL FIELD

The present invention relates to a text mining apparatus, a text mining method, and a text mining program that structure and analyze an electronic text stored on a computer with syntax analysis, etc. In particular, the present invention relates to a text mining apparatus, a text mining method, and a text mining program that are capable of determining and analyzing sentence structures having a similar meaning as an identical structure.

BACKGROUND ART

In general, as an example of a text mining apparatus, a structure shown in FIG. 1 is well-known (refer to patent document: Japanese Unexamined Patent Application Publication No. 2001-84250 (fourth and fifth pages and FIG. 3)). Referring to FIG. 1, the conventional text mining apparatus comprises a basic-dictionary storing unit, a document-data storing unit, a field-depending dictionary storing unit, a language feature analyzing device, a language analysis device, a pattern extracting device, and a frequent-pattern display device.

The conventional text mining apparatus shown in FIG. 1 is schematically operated as follows. First, the language feature analyzing device generates a field-depending dictionary from a basic dictionary and document data and the language analysis device generates the structure of a syntax tree or the like from the basic dictionary, the field-depending dictionary, and the document data. The pattern extracting device extracts a frequent pattern by using the structure, a storing unit of a document matching the frequent pattern stores a document in the document data matching the frequent pattern, and simultaneously outputs the frequent pattern.

In general, the following structures generated by the language analysis device are frequently used.

(A1) A clause in a sentence is represented by a node of the structure.
(A2) Information about an attached word is represented by an attribute value of the node.
(A3) Dependency is represented by a directional branch from a node on a modifier to a node on a modifiee.
(A4) Information about a surface case is represented by an attribute value of the directional branch.

Herein, the information about the attached word indicates an attached concept including tense such as present or perfect, modality such as easy or difficult, and negation. The information about the attached word is added to a clause by the attached word.

FIG. 2 shows an example of a syntax structure of such a sentence in the above form that ""彼は車種A が価格を下 げたのを 知らない Kare ha shashu A ga kakaku wo sageta no wo shiranai (He does not know that the price of a type A of vehicle has been down)". Clauses ""彼 kare (He)", ""車種A shashu A (type of A of vehicle)", ""価格 kakaku (price)", ""下げる sageru (has been down)", and ""知る shiru (know)" in the sentence are represented by nodes. The information about the attached word is represented by an attribute value of the node (as the attribute value of the node ""知る shiru (know)", the information about the attached word: negation). Dependency is represented by a directional branch from the node on the modifier to the modifiee (e.g., ""彼 kare (He)"→""知る shiru (know)"). Information about a surface case is represented by an attribute value of the directional branch (e.g., as the attribute value of the directional branch ""彼 kare (He)"→""知る shiru (know)", "surface case "は ha").

Further, all the information in the structure can be expressed by a structure comprising the nodes having labels without the attribute values and only the directional branch without the attribute value. FIG. 3 shows an example of a syntax structure of such a sentence in the above form that ""彼は車種A が価格を下 げたのを z,4 kare ha shashu A ga kakaku wo sageta no wo shiranai (He does not know that the price of the type of vehicle A has been down)".

Clauses ""彼 kare (He)", ""車種A shashu A (type A of vehicle)", ""価格 kakaku (price)", ""下げる sagenu (has been down)", and ""知る shiru (know)" in the sentence are represented by nopes having labels without the attribute value (e.g., a label "surface case "は ha" is added to the node ""彼 kare (He)", labels "information about the attached word perfect" and "surface case: を wo" are added), and the directional branch from the node on the modifier to the modifee does not have the attribute value.

The above-mentioned conventional system has the following problems. The following problems and the analysis for them are based on the research and examination result of the present inventors. Contents shown in FIGS. 4A to 4D, 5A, and 5B are presented by the present inventor for the purpose of specifically describing the cause of the problems.

As a first problem, it is exemplified that, upon detecting a frequent pattern, patterns with structures having a similar meaning and different connecting configurations are determined as entirely different patterns.

The connecting configuration indicates a configuration obtained by taking notice only on the node of the structure, a character string of words, a connecting relationship of the directional branch, and the direction and by omitting attached attribute information.

The reason why the first problem is caused is that the conventional text mining apparatus does not comprise means that determines the structures having different connecting configurations and a similar means, as the identical structure.

Examples of the difference between the structures having the different connecting configurations and the similar meaning are as follows upon using a sentence structure with the attribute value.

(B1) Difference between directions of the dependency,
(B2) Difference between dependency orders,
(B3) Difference due to replacement with synonyms, and
(B4) Difference between parallel syntax structures and meaning structures.

FIGS. 4A to 4D show examples of the differences between the structures due to the connecting configurations. Upon using the sentence structure without the attribute value, all differences having the similar meaning are expressed by the difference between the connecting configurations.

In the example shown in FIG. 4A, between connecting configurations of" 速いの は車種A hayai no ha shashu A (A fast type of vehicle is A)" and ""車種A は速い shashu A ha hayai (A type A of vehicle is fast)" having the similar meaning, the modifier and the modifes are different from each other.

In the example shown in FIG. 4B, between connecting configurations of ""速く安い車種A Hayaku yasui shashu A (A fast and cheap type of vehicle is A)" and ""安く速い車種A Yasuku hayai shashu A (A cheap and fast type of vehicle is A)" having the similar meaning, node order relationships of ""速い hayai (fast)" and ""安い yasui (cheap)" as modifiers are different from each other.

In the example shown in FIG. 4C, between connecting configurations ""車種A は速い shashu A ha hayai (A type A of vehicle is fast)" and ""車種Aは高速 だ shahu A ha kousoku da (A type A of vehicle has a high velocity)" having the similar meaning, node order relationships of ""速い hayai (fast)" and ""高速 kousoku (high velocity)" as the modifees are different from each other.

In the example shown in FIG. 4D, a syntax structure and a meaning structure of ""車種Aと車 種Bは速い shashu A to shashu B ha hayai (A type A of vehicle and a type B of vehicle are fast)" are indicated. Referring to FIG. 4D, there are a connecting configuration in which ""車種A shashu A (type A of vehicle)" as the modifier modifies the ""車種B shashu B (type B of vehicle)" and ""車種B shashu B (type B of vehicle)" modifies ""速い hayai (fast)" and a connecting configuration having directional branches from ""車種A shashu A (type A of vehicle)" and ""車種B shashu B (type B of vehicle)" as the modifiers to the ""速い hayai (fast)" as the modifee.

As a second problem, it is exemplified that structures having different attribute values and a similar meaning upon detecting a frequent pattern are determined as completely different patterns.

Because it is not considered in the conventional text mining apparatus that the structures having different attribute values are determined as an identical one.

Examples of the difference between the structures having different attribute values and the similar meaning upon using the sentence structure with the attribute value are the difference between the information about the attached word, the difference between the surface cases etc. FIGS. 5A and 5B show examples of the difference between the structures due to the attribute values.

In the example shown in FIG. 5A, between connecting configurations of ""車種A は加速 shashu A ha kasoku (a type A of vehicle accelerates)" and ""車種A の加速 shashu A no kasoku (acceleration of a type A of vehicle)" with the similar meaning, surface cases of directional branches differ from each other.

In the example shown in FIG. 5B, between connecting configurations of ""車種A "速い shashu A ha hayai (a type A of vehicle is fast)" and ""車種A は速かった shashu A ha hayakatta (a type A of vehicle was fast)" having the similar meaning, information about the attached word of a node ""速い hayai (fast)" as the modifiee differs from each other.

As a third problem, it is exemplified that it cannot be adjusted how similar structures are determined as an identical one by a user of the text mining apparatus upon detecting the frequent pattern.

Because it is not considered in the conventional text mining apparatus to adjust how similar structures are determined as an identical one by a user upon detecting the frequent pattern.

Accordingly, it is one object of the present invention to provide a text mining apparatus, method, and program in which structures having a similar meaning and different connecting configurations are determined as an identical pattern and a frequent pattern is detected.

It is another object of the present invention to provide a text mining apparatus, method, and program capable of determining whether or not structures having a similar meaning and different attribute values are as an identical one and of adjusting the detection of a frequent pattern.

It is further another object of the present invention to provide a text mining apparatus, method, and program capable of adjusting the determination as how similar structures are an identical one by a text mining user and the detection of a frequent pattern.

DISCLOSURE OF INVENTION

The present invention disclosed in this application has the following schematic structure so as to accomplish the objects.

According to a first aspect of the present invention, a text mining apparatus comprises means that generates a sentence structure from an input document, means that generates a similar structure of patterns having a similar meaning of a partial structure of the sentence structure by performing pre-determined conversion operation of the partial structure, and means that determines the patterns having the similar meaning as the identical pattern and detects the pattern.

According to the present invention, the means for generating the similar structure comprises means that performs parallel modification of the sentence structure, means that generates a partial structure of the sentence structure, means that performs non-directional branching of a directional branch of the sentence structure and/or partial structure, means that replaces a synonym in the sentence structure and/or partial structure by referring to a synonym dictionary, and means that performs non-ordering of ordering trees of the sentence structure and/or partial structure, and uses the similar structures as an equivalent class of the partial structure of the sentence structure. The equivalent class means that elements in a set of structures are used with an identical structure. When two equivalent classes include at least one identical element, the two equivalent classes are determined as the identical equivalent class. According to the present invention, the generated similar structure is used as the equivalent class of the sentence structure on the generation side, and the frequent pattern is detected.

According to a second aspect of the present invention, a text mining apparatus comprises frequent-similar-pattern detection means that ignores the difference between the attribute values in the structure and detects the frequent pattern, in place of the frequent-pattern detection means included in the text mining apparatus according to the first aspect. The frequent-similar-pattern detection means determines similar structures having different attribute values as an identical one, and detects the frequent pattern. According to the present invention, the similar structures having different attribute values therein are determined as an identical one, and the frequent pattern is detected.

According to a third aspect of the present invention, a text mining apparatus comprises a storage unit that stores a set of documents as a text mining object, an analyzing unit that reads and analyzes the document from the storage unit and obtains a sentence structure, a similar-structure generation adjustment unit that generates a first determination item for determining, from a user input, whether or not the structures are identical one every type of differences between the sentence structures, a similar-structure determination adjustment unit that generates a second determination item for determining, from a user input, whether or not the structures are identical ones every type of differences between attribute values, a similar-structure generating unit that performs predetermined conversion operation of a partial structure of the sentence structure obtained by the analyzing unit in accordance with the first determination item generated by the similar-structure generation adjustment unit and generates similar structures having a similar meaning of the partial structure, and a similar-pattern detecting unit that uses the similar structure generated by the similar-structure generating unit as an equivalent class of the partial structure on the generation source and detects the frequent pattern by ignoring the difference between the attribute values in accordance with the second determination item of the similar-structure determination adjustment unit. According to the present invention, a determination input for adjusting whether or not the structures are identical is received.

Further, according to a fourth aspect of the present invention, a method comprises a step of generating a sentence structure from an input document, a step of generating a similar structure of patterns having a similar meaning of a partial structure of the sentence structure by performing predetermined conversion operation of the partial structure, and a step of determining the patterns having the similar meaning as the identical pattern and detecting the pattern.

Furthermore, according to a fifth aspect of the present invention, a method comprises a step of analyzing a document in a storage unit that stores a set of documents as a text mining object and obtaining a sentence structure, a step of generating a similar structure of patterns having a similar meaning of a partial structure of the sentence structure, and a step of using the generated similar structure as an equivalent class of the partial structure on the generation source and detecting a pattern by ignoring the difference between attribute values.

In addition, according to a sixth aspect of the present invention, a method comprises a step of analyzing a document from a storage unit that stores a set of documents as a text mining object and obtaining the sentence structure, a step of generating, from input information of a user input from an input device, a first determination item for determining whether or not the structures are identical ones every type of differences between sentence structures (connecting configurations) and a second determination item for determining whether or not the structures are identical ones every type of differences between attribute values, a step of generating a similar structure having a similar meaning of the partial structure of the sentence structure in accordance with the first determination item for determining whether or not the structures are identical ones every type of differences between sentence structures (connecting configurations), and a step of using the generated similar structure as an equivalent class of the partial structure on the generation source and detecting the frequent pattern by ignoring the difference between the attribute values in accordance with the second determination item for determining whether or not the structures are identical ones every type of differences between attribute values.

In addition, according to a seventh aspect of the present invention, a program enables a computer forming a text mining apparatus to execute processing for analyzing a document in a storage unit that stores a set of documents as a text mining object and obtaining a sentence structure, processing for performing predetermined conversion operation of a partial structure of the sentence structure and generating a similar structure having a similar meaning of the partial structure, and processing for using the generated similar structure as an equivalent class of the partial structure on the generation source and detecting a predetermined pattern.

BRIEF DESCRIPTION OF THE DRAWINGS

FIG. 15 is a diagram showing an example of a text set in a text DB used in first to third examples of the present invention.

FIG. 16A is a diagram showing a sentence structure of a sentence 1 obtained by language analysis means 21.

FIG. 16B is a diagram showing a sentence structure of a sentence 2 obtained by the language analysis means 21.

FIG. 16C is a diagram showing a sentence structure of a sentence 3 obtained by language analysis means 21.

FIG. 20A is a diagram showing non-directional branching processing (step A2-3) for a partial structure 2a-0.

FIG. 20B is a diagram showing non-directional branching processing (step A2-3) for a partial structure 2c-0.

FIG. 20C is a diagram showing non-directional branching processing (step A2-3) for a partial structure 2a-1.

FIG. 20D is a diagram showing non-directional branching processing (step A2-3) for a partial structure 2g-0.

FIG. 20E is a diagram showing non-directional branching processing (step A2-3) for a partial structure 2b-0.

BEST MODE FOR CARRYING OUT THE INVENTION

Hereinbelow, a specific description is given of embodiments of the present invention with reference to drawings.

Figure 1:
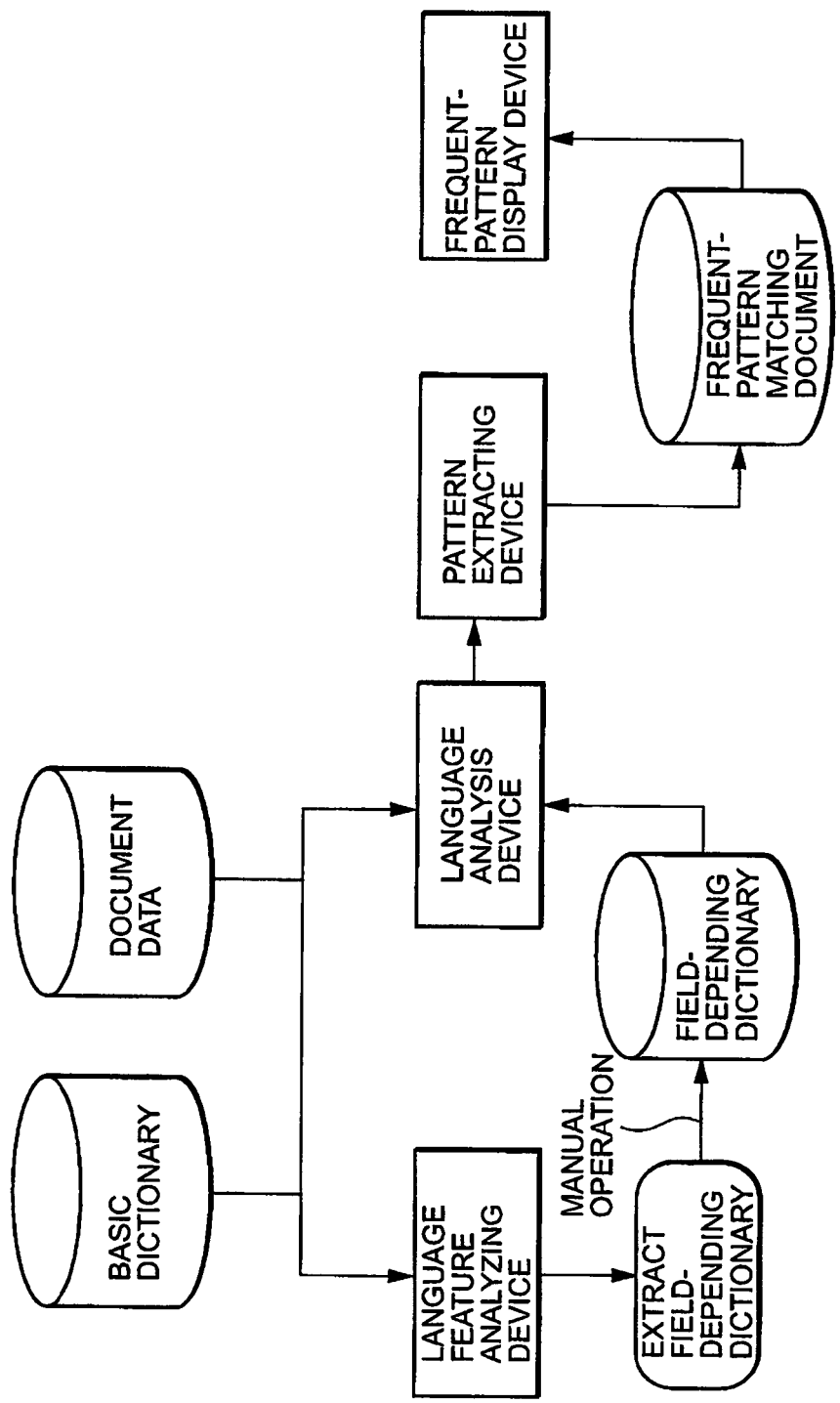
FIG. 1 is a diagram showing the constitution according to a conventional art.
Figure 2:
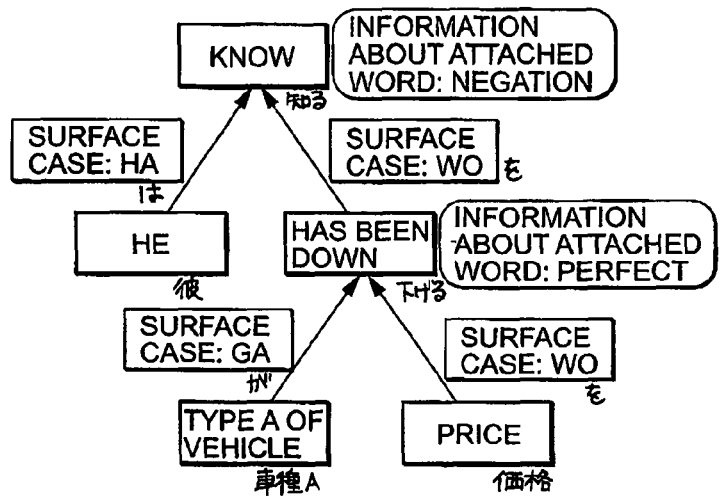
FIG. 2 is a diagram showing an example of a syntax structure of a sentence ""彼は私が本 を買ったのを 知らない kare ha watashi ga hon wo katta no wo shiranai (he does not know that I bought a book)" expressed in a form with an attribute value.
Figure 3:
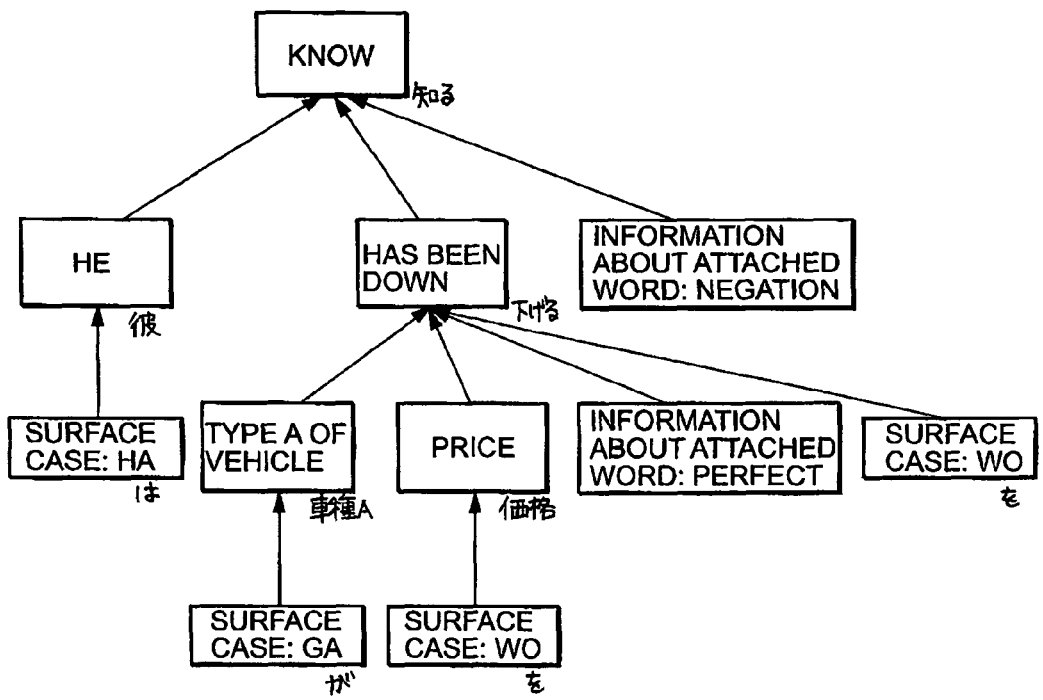
FIG. 3 is a diagram showing an example of the syntax structure ""彼は私が本 を買ったのを 知らない kare ha watashi ga hon wo katta no wo shiranai (he does not know that I bought a book)" expressed in a form without the attribute value.
Figure 4A:
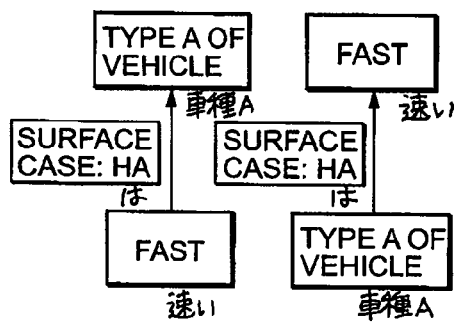
FIG. 4A is a diagram showing an example of the difference between structures having different connecting configurations and a similar meaning, further showing the difference between dependency directions.
Figure 4B:
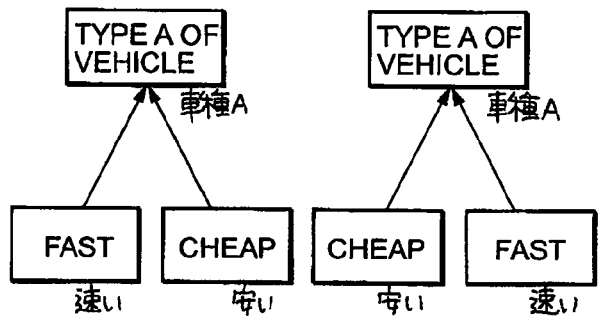
FIG. 4B is a diagram showing an example of the difference between structures having different configurations and a similar meaning, further showing the difference between dependency orders.
Figure 4C:
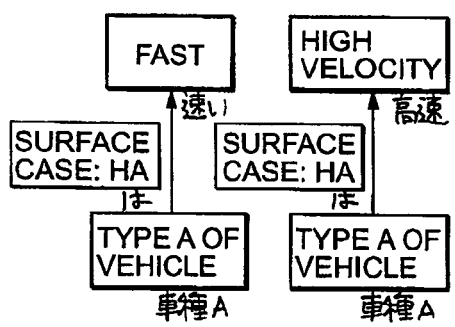
FIG. 4C is a diagram showing an example of the difference between structures having different configurations and a similar meaning, further showing the difference caused by synonym replacement.
Figure 4D:
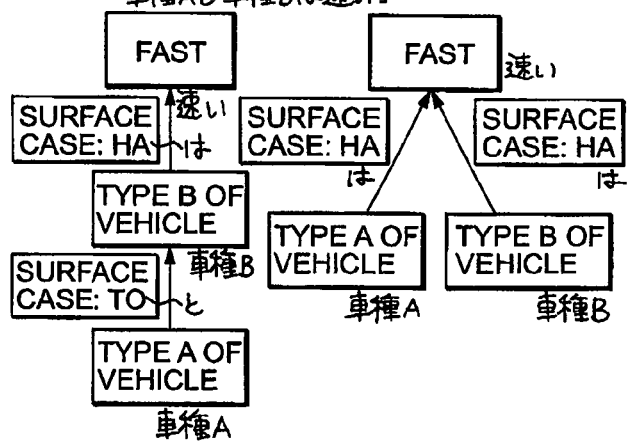
FIG. 4D is a diagram showing an example of the difference between structures having different configurations and a similar meaning, further showing the difference between a parallel-sentence structure and a meaning structure.
Figures 5A, 5B:
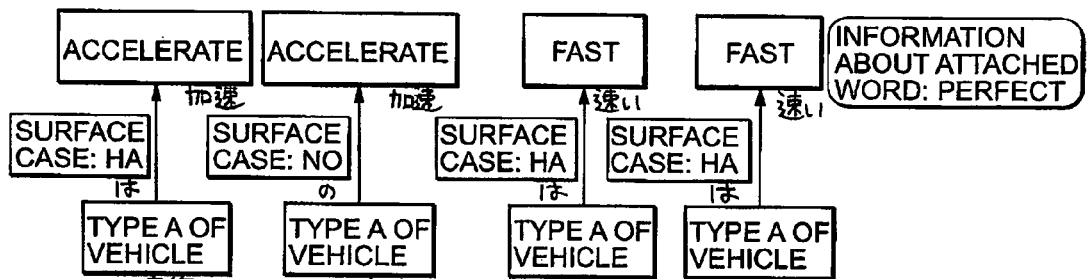
FIG. 5A is a diagram showing a plurality of examples of the difference between structures having different attribute values and a similar meaning, further showing the difference between information about attached words.
FIG. 5B is a diagram showing a plurality of examples of the difference between structures having different attribute values and a similar meaning, further showing the difference between surface cases.
Figure 6:
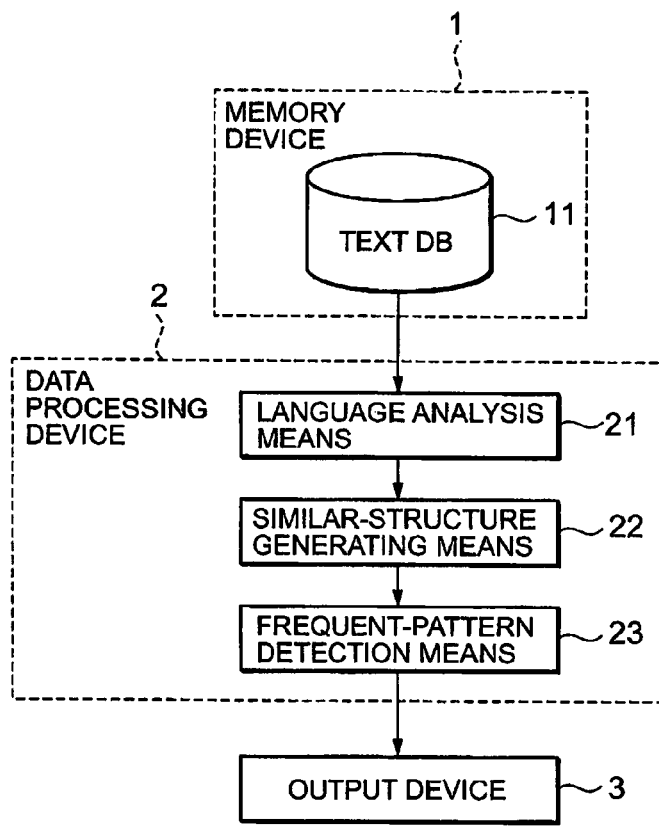
FIG. 6 is a diagram showing the structure according to the first embodiment of the present invention.

Referring to FIG. 6, an apparatus according to the first embodiment of the present invention comprises a memory device 1 that stores information, a data processing device 2 that is operated under programs, and an output device 3 that outputs the detected pattern. The memory device 1 comprises a text database (DB) 11. The text DB 11 stores a set of texts as a text mining object.

The data processing device 2 comprises language analysis means 21, similar-structure generating means 22, and frequent-pattern detection means 23. These means are schematically operated as follows.

The language analysis means 21 reads a set of texts from the text DB 11, consequently analyzes the texts in the set, and obtains a sentence structure.

The similar-structure generating means 22 extracts all partial structures forming each sentence structure in the set of sentence structures sent from the language analysis means 21, generates all similar structures in each partial structure, and thus sets the similar structure and the partial structure on the generation source as an equivalent class.

The frequent-pattern detection means 23 detects the frequent pattern from the set of equivalent classes of the partial structure sent from the similar-structure generating means 22, and sends the detected frequent pattern to the output device 3.

Figure 7:
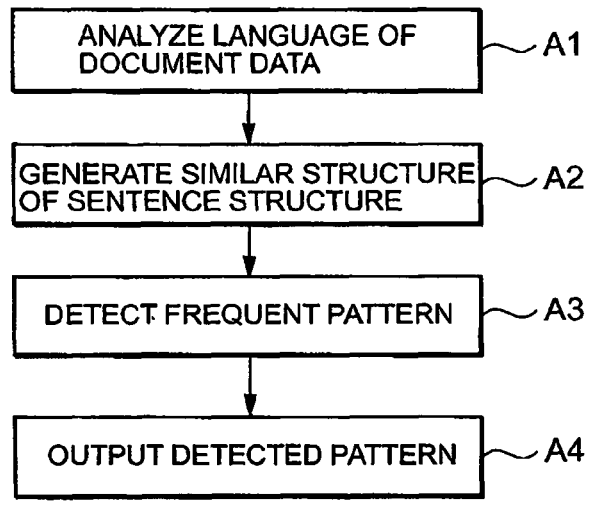
FIG. 7 is a flowchart for illustrating the operation according to the first embodiment.

FIG. 7 is a flowchart for illustrating the operation according to the first embodiment. Next, a specific description is given of the operation of the apparatus according to the first embodiment of the present invention with reference to FIGS. 6 and 7.

First, the language analysis means 21 reads the set of texts from the text DB 11. The language analysis means 21 analyzes the texts in the set of texts, generates the sentence structure as the analysis result, and sends the generated sentence structure to the similar-structure generating means 22 (step A1 in FIG. 7).

Subsequently, the similar-structure generating means 22 generates all similar structures of the partial structure in the set of given sentence structures and thus sets the similar structure as the equivalent class of the partial structure on the generation source. Thereafter, the similar-structure generating means 22 sends a set of the equivalent classes to the frequent-pattern detection means 23 (step A2 in FIG. 7).

Further, the frequent-pattern detection means 23 detects the frequent pattern from the equivalent class of the given partial structure (step A3 in FIG. 7).

The frequent-pattern detection means 23 outputs the detected frequent pattern to the output device 3 (step A4 in FIG. 7).

Figure 8:
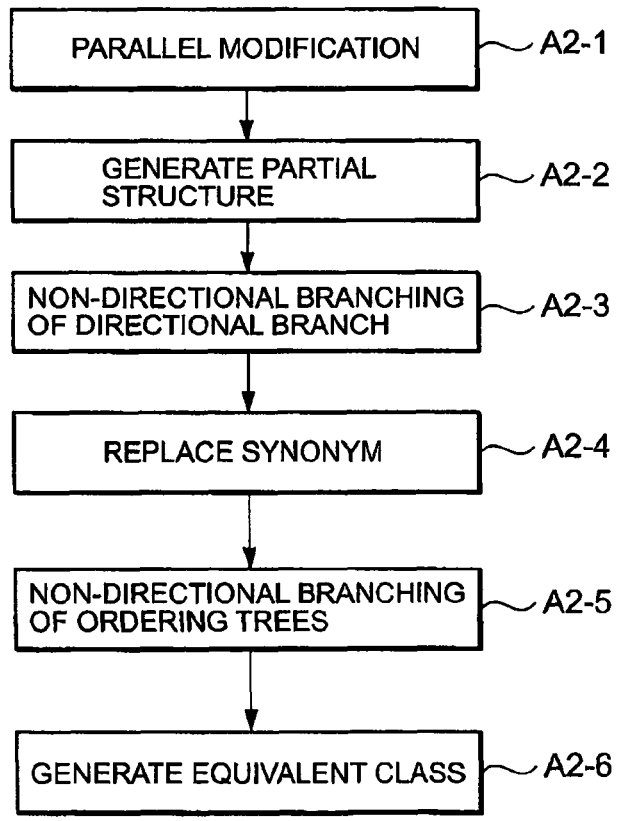
FIG. 8 is a flowchart for illustrating the operation of similar-structure generating means 22 according to embodiments.

FIG. 8 is a diagram showing a specific flowchart of the operation of the similar-structure generating means 22 in step A2 in FIG. 7.

Referring to FIG. 8, the similar-structure generating means 22 performs "parallel modification" corresponding to the difference between a syntax structure of the parallel syntax and a meaning structure (step A2-1 in FIG. 8).

Subsequently, "Generate the partial structure" is performed so as to detect the pattern from the partial structure as well as from all the sentence structures (step A2-2 in FIG. 8).

Subsequently, "Non-directional branching of a directional branch" corresponding to the difference between dependency directions is performed (step A2-3 in FIG. 8).

Subsequently, "Replace synonym" corresponding to the difference between the synonyms is performed (step A2-4 in FIG. 8).

"Non-ordering of ordering tress" corresponding to the difference between the dependency orders is performed (step A2-5 in FIG. 8).

Finally, the similar structure is set as an element of the equivalent class in the partial structure on the generation source, thereby performing "Generate the equivalent class" (step A2-6 in FIG. 8).

Hereinbelow, a description is given of the operation and the advantage of the apparatus according to the first embodiment of the present invention.

The apparatus according to the first embodiment uses the similar structure generated by the similar-structure generating means 22 as the equivalent class in the original structure and detects the frequent pattern. Thus, it can be determined that the structures having different connecting configurations and the similar meaning are determined as the identical one and the frequent pattern can be detected.

Next, a specific description is given of the second embodiment of the present invention with reference to the drawings.

Figure 9:
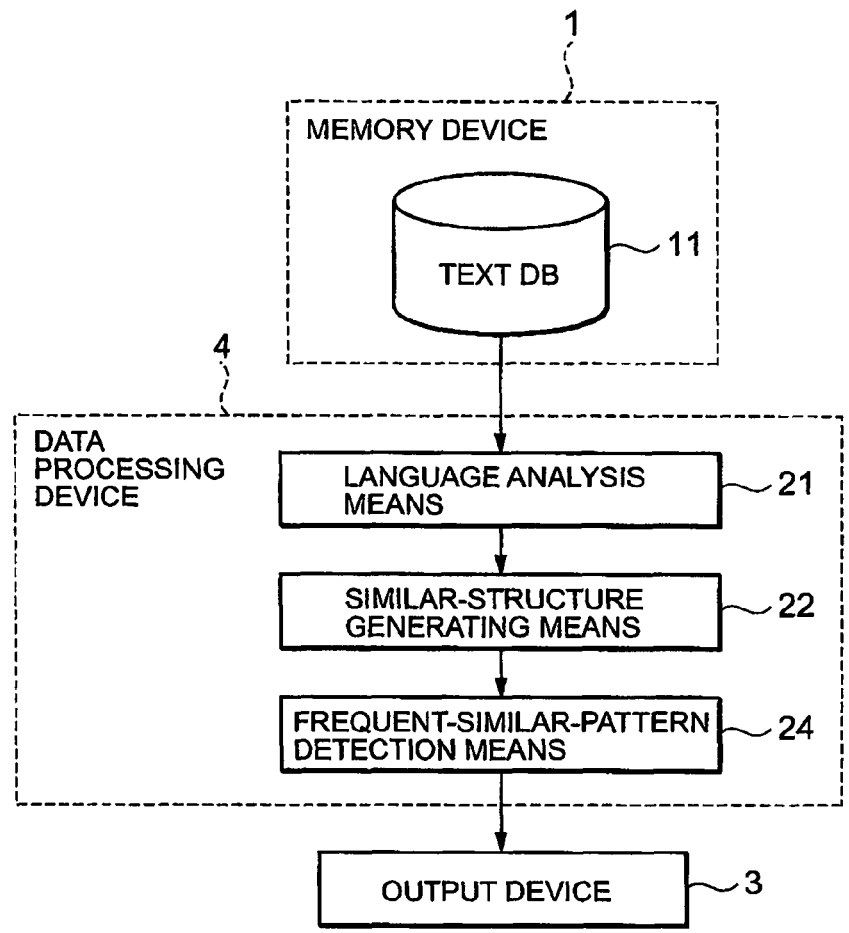
FIG. 9 is a diagram showing the constitution according to the second embodiment of the present invention.

Referring to FIG. 9, an apparatus according to the second embodiment of the present invention is the same as the apparatus according to the first embodiment, other than the data processing device 4 having frequent-similar-pattern detection means 24 instead of the frequent-pattern detection means 23 of the data processing device 2. The language analysis means 21 and the similar-structure generating means 22 are the same as those according to the first embodiment.

According to the second embodiment, the frequent-similar-pattern detection means 24 ignores the difference between the attribute values and detects the frequent pattern from the set of the equivalent classes in the partial structure sent from the similar-structure generating means 22, and sends the detected frequent pattern to the output device 3.

Figure 10:
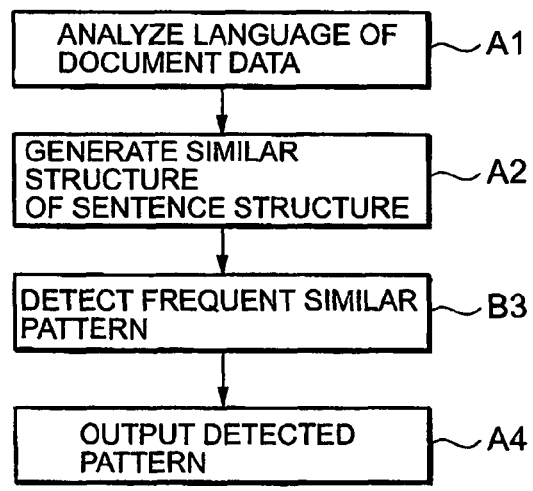
FIG. 10 is a flowchart for illustrating the operation according to the second embodiment of the present invention.

FIG. 10 is a flowchart for illustrating the operation of the apparatus according to the second embodiment of the present invention. Next, a specific description is given of the operation of the apparatus according to the second embodiment with reference to FIGS. 9 and 10. According to the second embodiment, instead of step A3 in FIG. 7, step B3 is executed. Processing shown in steps A1, A2, and A4 in FIG. 10 is the same as that according to the first embodiment and a description thereof is consequently omitted.

According to the first embodiment, the frequent-pattern detection means 23 does not determine the structures having the identical connecting configuration and different attribute values as the identical one and detects the frequent pattern.

However, according to the second embodiment, the frequent-similar-pattern detection means 24 determines that, for the set of the equivalent classes given from the similar-structure generating means 22, the structures having the identical connecting configuration and different attribute values as the identical structure, detects the frequent pattern, and sends the detected frequent pattern to the output device 3 (step B3 in FIG. 10).

Next, a description is given of the operation and the advantage of the apparatus according to the second embodiment of the present invention.

According to the second embodiment of the present invention, the frequent-similar-pattern detection means 24 determines even the structures having the identical connecting configuration and different attribute values as the identical structure and detects the frequent pattern. Therefore, the structures having different attribute values and the similar meaning can be determined as the identical structure and the frequent pattern can be detected.

Next, a specific description is given of the third embodiment of the present invention with reference to the drawings.

Figure 11:
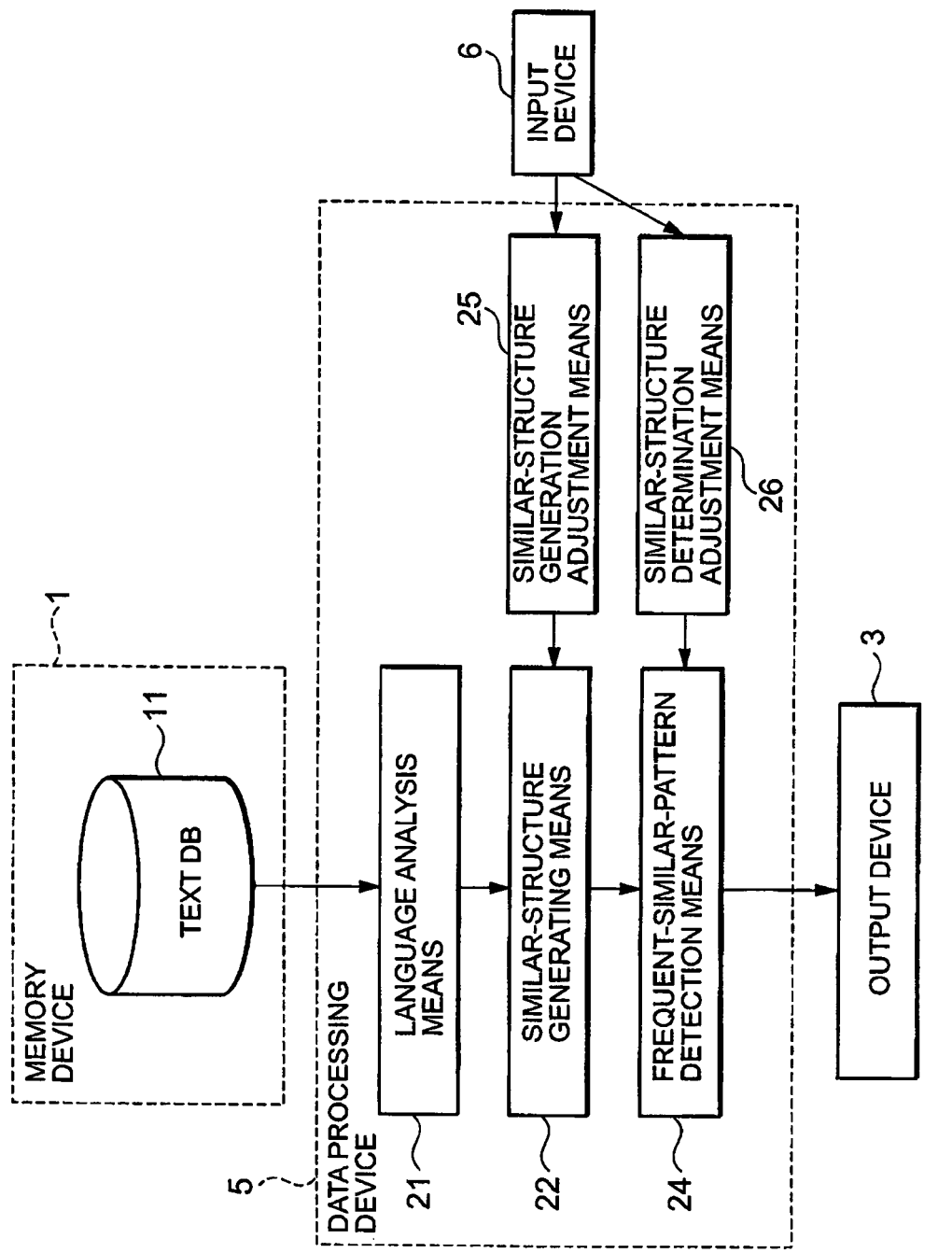
FIG. 11 is a diagram showing the constitution according to the third embodiment of the present invention.

Referring to FIG. 11, an apparatus according to the third embodiment of the present invention is the same as that according to the second embodiment, other than an input device 6 and a data processing device 5 having similar-structure generation adjustment means 25 and similar-structure determination adjustment means 26.

The input device 6 receives, from a user, an input for determining whether or not the structures are identical every type of differences between the sentence structures, and an input for determining whether or not the difference between the attribute values is ignored every type of attribute values, and sends the inputs to the similar-structure generation adjustment means 25 and the similar-structure determination adjustment means 26.

The determination inputs received by the input device 6 are as follows.

"Determination item from a user about whether or not the structures are determined as the identical one every type of difference between the sentence structures and about whether or not the difference between the attribute values is ignored every type of attribute values", and "Example of such a sentence that it is not determined that the identical pattern is included upon detecting the frequent pattern", "Example of such a sentence that it is determined that the identical pattern is included upon detecting the frequent pattern".

The similar-structure generation adjustment means 25 determines, in accordance with the determination given from the input device 6, whether or not the structures are identical every type of differences between the connecting configurations, and sends the determination item to the similar-structure generating means 22.

Further, the similar-structure determination adjustment means 26 determines, in accordance with the determination given from the input device 6, whether or not the difference between the attribute values is ignored every type of attribute values, and sends the determination item to the frequent-similar-pattern detection means 24.

The similar-structure generating means 22 generates the similar structure of the partial structures in the individual structures of the set given from the language analysis means 21 in accordance with the similar-structure generation adjustment means 25, and thus sets the generated similar structure as the equivalent class of the partial structure on the generation source.

The frequent-similar-pattern detection means 24 detects the frequent pattern from the set of equivalent classes given from the similar-structure generating means 22 in accordance with the determination from the similar-structure determination adjustment means 26 by ignoring the difference between the attribute values.

Figure 12:
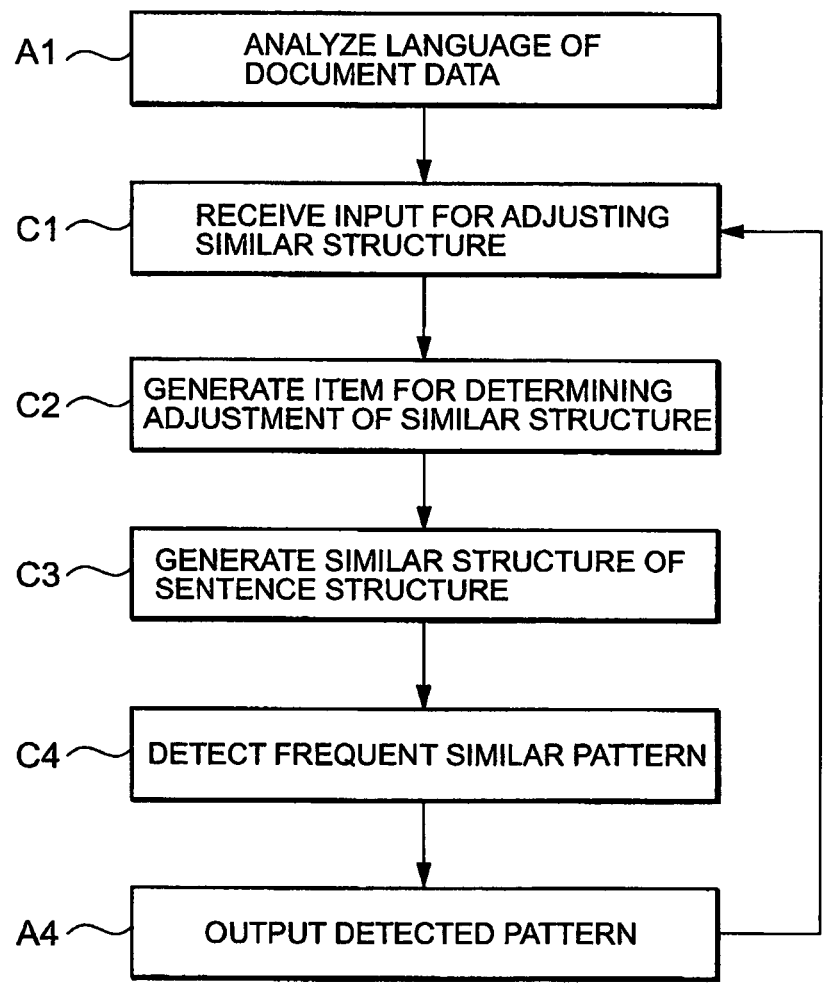
FIG. 12 is a flowchart for illustrating the operation according to the third embodiment of the present invention.

FIG. 12 is a flowchart for illustrating the operation of the apparatus according to the third embodiment of the present invention. Next, a specific description is given of the operation of the apparatus according to the third embodiment of the present invention with reference to flowcharts shown in FIGS. 11 and 12.

First, the language analysis means 21 reads the set of texts from the text DB 11.

The language analysis means 21 analyzes each text in the set of ones, generates the sentence structure as the analysis result, and sends the generated sentence structure to the similar-structure generating means 22 (step A1 in FIG. 12). The operation of the language analysis means 21 in step A1 in FIG. 12 is the same as that of the language analysis means 21 according to the first embodiment.

Subsequently, the input device 6 receives, from a user, an input for determining whether or not the structures are identical every type of differences between the sentence structures and an input for determining whether or not the difference between the attribute values is ignored every type of attribute values, and sends the received inputs to the similar-structure generation adjustment means 25 and the similar-structure determination adjustment means 26, respectively (step C1 in FIG. 12).

The similar-structure generation adjustment means 25 receives the determination from the input device 6, generates a determination item for determining whether or not the structures are identical every type of differences between the sentence structures, and sends the generated determination item to the similar-structure generating means 22. Further, the similar-structure determination adjustment means 26 receives the determination from the input device 6, generates a determination item for determining whether or not the difference between the attribute values is ignored every type of attribute values, and sends the generated determination item to the frequent-similar-pattern detection means 24 (step C2 in FIG. 12).

The similar-structure generating means 22 generates the similar structure of the partial structure forming the sentence structure in the set given from the language analysis means 21 in accordance with the determination from the similar-structure generation adjustment means 25, thus sets the generated similar structure as the equivalent class of the partial structure on the generation source, and sends the set of equivalent classes to the frequent-similar-pattern detection means 24 (step C3 in FIG. 12).

The frequent-similar-pattern detection means 24 ignores the attribute value in accordance with the determination from the similar-structure determination adjustment means 26, and detects the frequent pattern from the set of equivalent classes given from the similar-structure generating means 22 (step C4 in FIG. 12).

Finally, the frequent-similar-pattern detection means 24 outputs the detected frequent pattern to the output device 3 (step A4 in FIG. 12).

Figure 13:
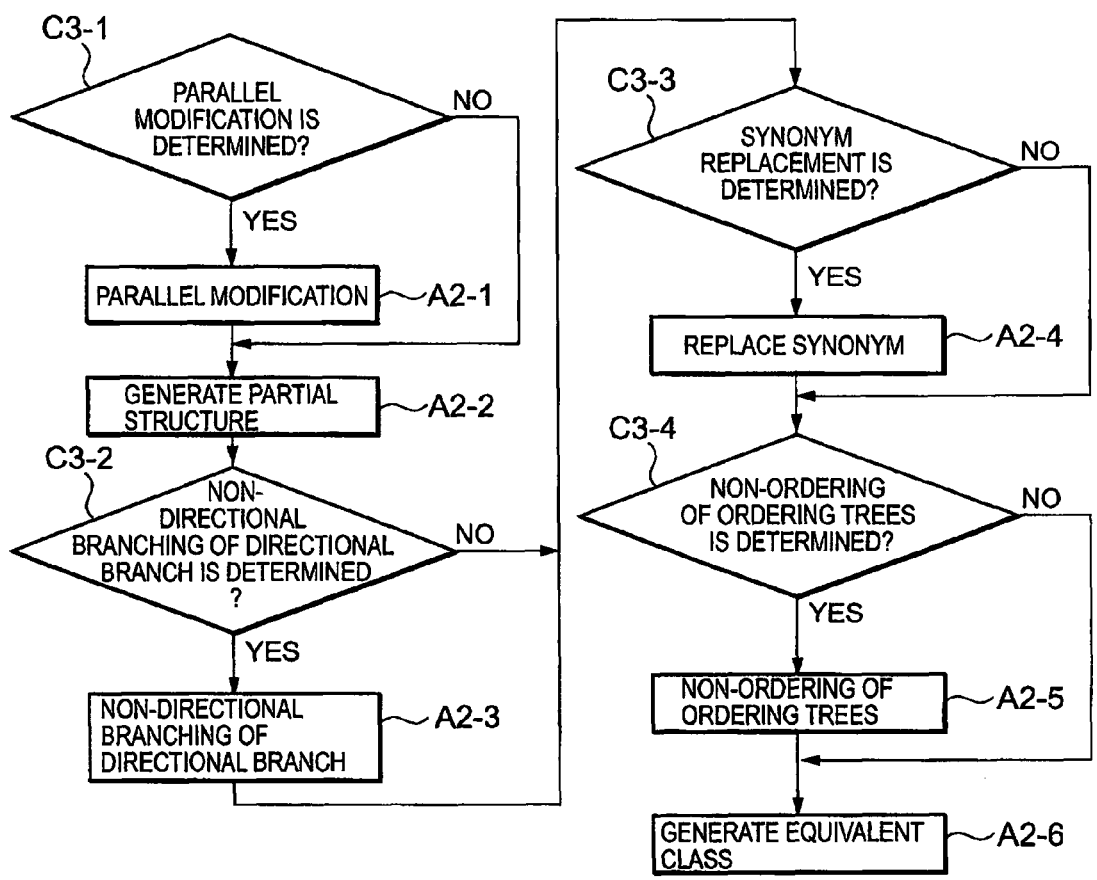
FIG. 13 is a flowchart for illustrating the operation of similar-structure generating means 22 according to the third embodiment of the present invention.

FIG. 13 is a flowchart of specific operation of the similar-structure generating means 22 in step C3 in FIG. 12.

Referring to FIG. 13, in the determination in step C3-1 whereupon the parallel modification is determined, the similar-structure generating means 22 performs the parallel modification (step A2-1 in FIG. 13) so as to generate the partial structure (step A2-2 in FIG. 13), and when the parallel modification is not determined, the operation of the similar-structure generating means 22 shifts to processing in step A2-2. The parallel modification and the generation of the partial structure are the same as those in steps A2-1 and A2-2 in FIG. 8.

In the determination in step C3-2 whereupon the non-directional branching of the directional branch is determined, the similar-structure generating means 22 performs the non-directional branching of the directional branch (step A2-3 in FIG. 13). When the non-directional branching of the directional branch is not determined, the operation of the similar-structure generating means 22 shifts to processing in step C3-3. The non-directional branching of the directional branch is the same as that in step A2-3 in FIG. 8.

In the determination in step C3-3 whereupon the replacement of the synonym is determined, the similar-structure generating means 22 replaces the synonym (step A2-4 in FIG. 13). When the replacement of the synonym is not determined, the processing advances to that in step C3-4. The replacement of the synonym is the same as that in step A2-4 in FIG. 8.

In the determination in step C3-3 whereupon the non-ordering of ordering trees is determined, the non-ordering of ordering trees is performed (step A2-5 in FIG. 13). When the non-ordering of ordering trees is not determined, the processing advances to that in step A2-6.

In step A2-6, the equivalent class is generated. The non-ordering of ordering trees and the generation of the equivalent class are the same as those in steps A2-5 and A2-6 in FIG. 8.

As mentioned above, according to the third embodiment, it is adjusted, in accordance with the determination given from the similar-structure generation adjustment means 25, whether or not the parallel modification (step A2-1 in FIG. 13), the non-directional branching of the directional branch (step A2-3 in FIG. 13), the replacement of the synonym (step A2-4 in FIG. 13), and the non-ordering of ordering trees (in step A2-5 in FIG. 13) are executed. This point is different from the similar-structure generating means 22 shown in FIG. 8 according to the first embodiment.

A user refers to the output pattern, returns to step C1 whereupon the user inputs the determination as how similar structures are identical, and detects the frequent pattern again according to the present invention.

Next, a description is given of the operation and the advantage of the apparatus according to the third embodiment of the present invention.

According to the third embodiment, the similar-structure generation adjustment means and the similar-structure determination adjustment means adjust, in accordance with the user determination, how similar structures are determined as the identical one. As a consequence, the user can adjust the determination as how similar structures are identical and the detection of the frequent pattern.

Next, the fourth embodiment of the present invention will be described in detail with reference to the drawings.

Figure 14:
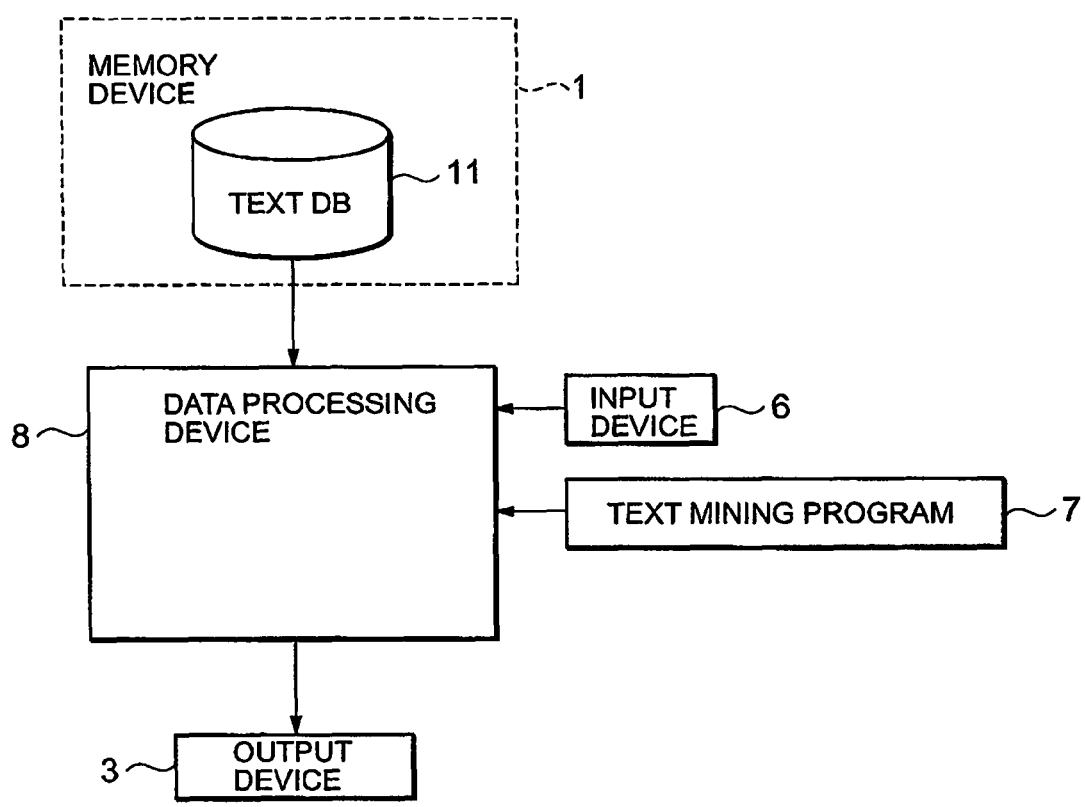
FIG. 14 is a diagram showing the constitution according to the fourth embodiment of the present invention.

Referring to FIG. 14, an apparatus according to the fourth embodiment of the present invention is embodied by a computer forming the first to third embodiments. In this case, FIG. 14 is a diagram showing the constitution of a computer operated by the program.

A text mining program 7 is read to a data processing device 8, and adjusts the operation of the data processing device 8. The data processing device 8 adjusts the text mining program 7 so as to execute the following processing, that is, the same processing as those of the data processing devices 2, 4, and 5 according to the first to third embodiments.

Next, a specific description is given of examples according to the present invention.

First, a first example of the present invention will be described with reference to the drawings. The first example of the present invention is an example of the first embodiment.

An apparatus according to the first example comprises a personal computer serving as the data processing device 2 shown in FIG. 6, a magnetic disk storage device serving as the memory device 1, and a display serving as the output device 3.

A personal computer 2 comprises a central processing unit (CPU) functioning as the language analysis means 21, the similar-structure generating means 22, and the frequent-pattern detection means 23. The magnetic disk storage device stores a set of texts serving as the text DB 11.

FIG. 15 is a diagram showing contents of the set of texts.

The language analysis means 21 analyzes the language of each text in the set of texts shown in FIG. 15 in the text DB 11, and thus obtains the sentence structure of the text (step A1 in FIG. 7).

FIGS. 16A to 16C show the sentence structures of sentences 1 to 3 obtained by the language analysis means 21.

Subsequently, the similar-structure generating means 22 generates all similar structures in the partial structure forming the sentence structures shown in FIGS. 16A to 16C, and thus sets the generated similar structure as the equivalent class of the partial structure on the generation source (step A2 in FIG. 7).

In the first example, a description is given of an example of a state for generating the equivalent class of the partial structure from the sentence structure of the sentence 2 "('速く安い 車種A' Hayaku yasui shashu A (a fast and cheap type A of vehicle)") shown in FIG. 16B. The example is shown in FIGS. 18 to 21.

Figures 17, 18:
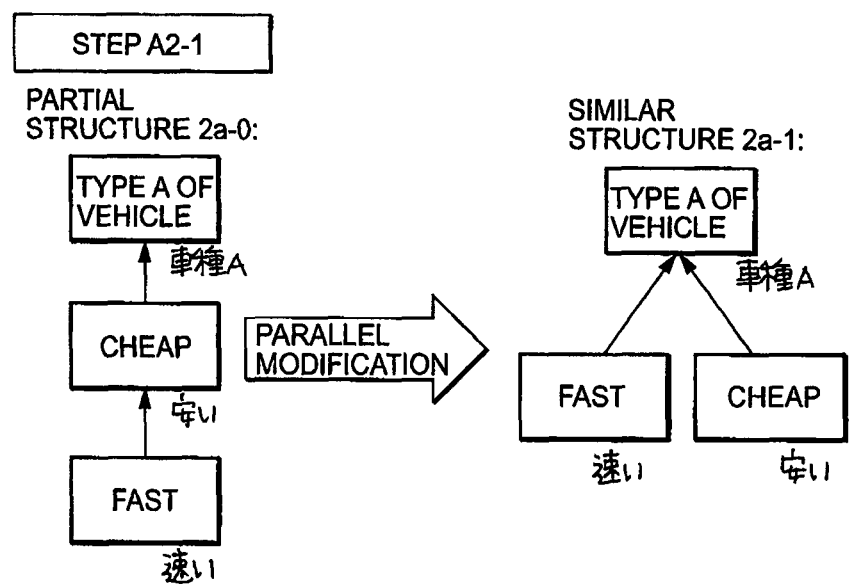
FIG. 17 is a diagram showing the structure of a synonym dictionary used in the first to third examples of the present invention.
FIG. 18 is a diagram showing processing in step A2-1 in FIG. 8 according to the first to third examples of the present invention.

Referring to FIG. 18, the similar-structure generating means 22 modifies the parallel structure (step A2-1 in FIG. 8), subsequently modifies a connecting relationship between "速い hayai (fast)" and ""安い yasui (cheap)" as a parallel relationship in a partial structure 2a-0, and generates a similar structure 2a-1.

Figure 19:
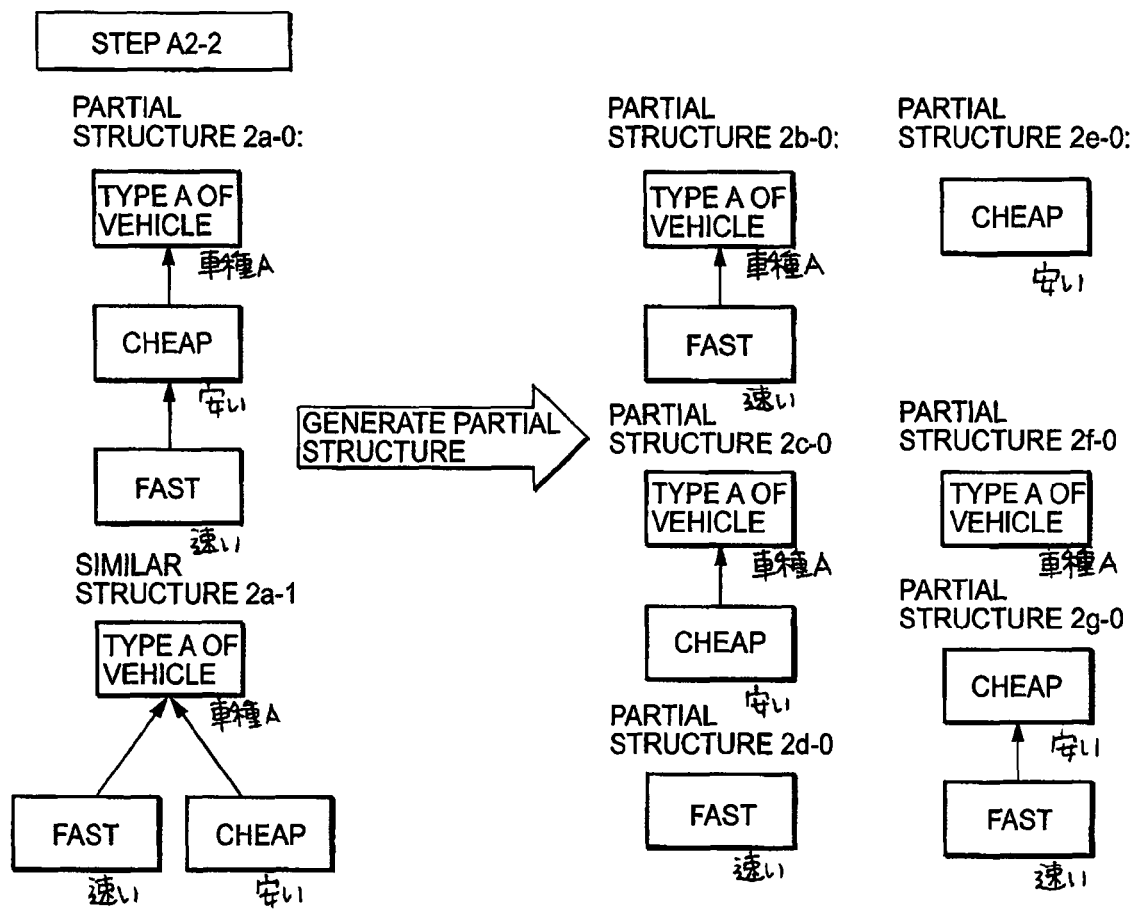
FIG. 19 is a diagram showing processing in step A2-2 in FIG. 8 according to the first to third examples of the present invention.

Referring to FIG. 19, the similar-structure generating means 22 subsequently generates the partial structure (step A2-2 in FIG. 8), and generates partial structures 2c-0 and 2g-0 indicating a relationship between two words from the partial structure 2a-0 and partial structures 2d-0, 2e-0, and 2f-0 indicating a one word.

Further, the similar-structure generating means 22 generates a partial structure 2b-0 indicating a relationship between two words that are not included in the partial structure 2a-0 from the similar structure 2a-1.

Incidentally, the structures generated from both the partial structure 2a-0 and the similar structure 2a-1 are used as one.

Further, the partial structure 2a-0 and the similar structure 2a-1 used for generating the partial structure herein are used as the partial structure and the similar structure in the future generation of the similar structure.

Figures 20A, 20B, 20C, 20D, 20E:
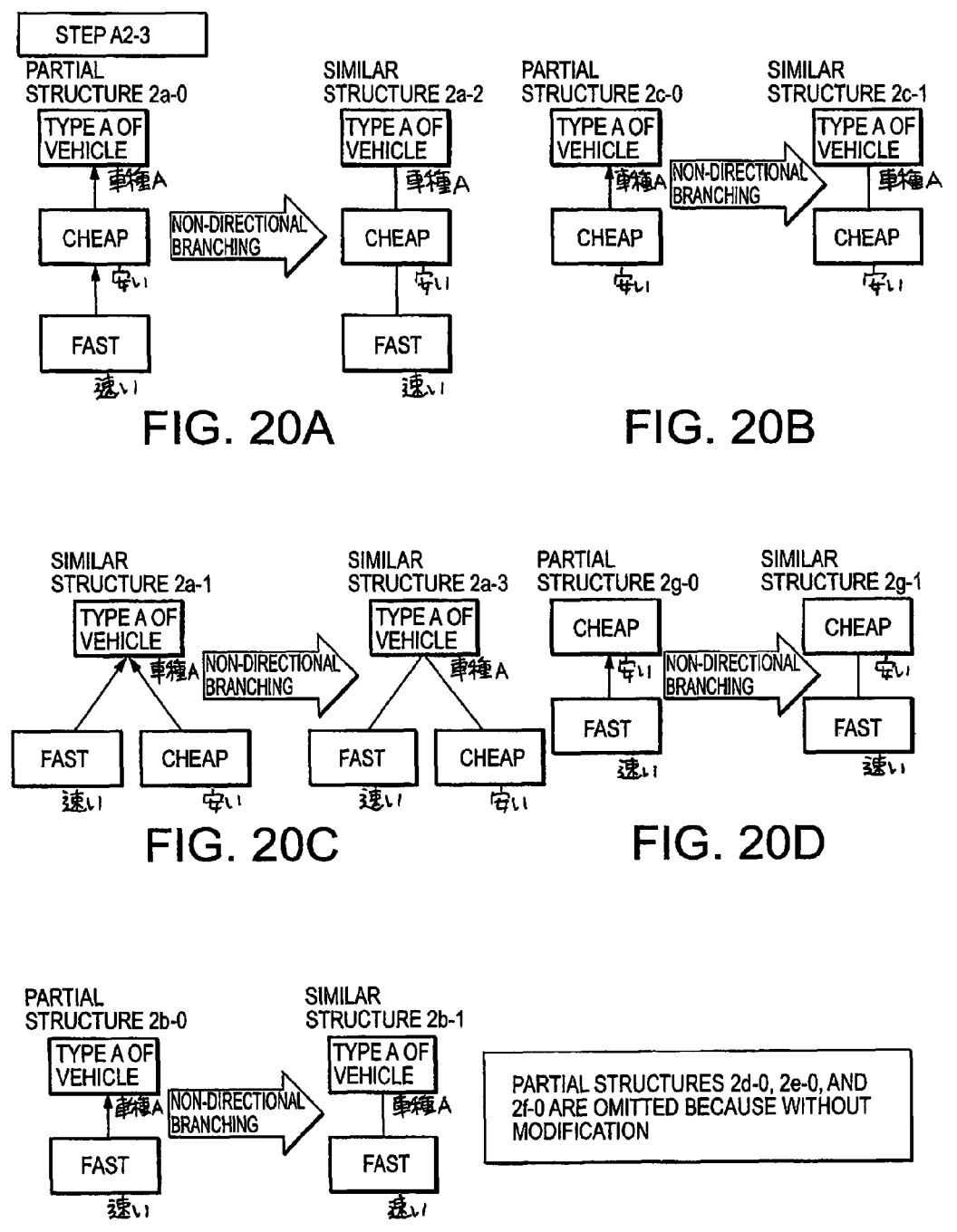

Subsequently, the similar-structure generating means 22 performs the non-directional branching of the directional branch (step A2-3 in FIG. 8). In the example, non-directional branching of all the directional branches in the partial structure generated in step A2-2 is performed, thereby generating a new similar structure. Referring to FIG. 20A, e.g., non-directional branching of the directional branch of the partial structure 2a-0 is performed and a similar structure 2a-2 is thus generated. Incidentally, the partial structures 2d-0, 2e-0, and 2f-0 individually comprising one word without the directional branch are not modified in step A2-3 and are therefore omitted FIGS. 20A to 20E.

Subsequently, the synonym is replaced (step A2-4 in FIG. 8). In the "replacement of the synonym" according to the first example, a replaced word defined in the synonym dictionary given in advance by a user is replaced to a representative word.

Referring to FIG. 17, the synonym dictionary used in the first example is determined that only one dictionary item for replacing a replaced word "kousoku (high velocity)" to a representative word ""速い hayai (fast)" is registered.

The partial structure and the similar structure generated at this time do not include the replaced word ""高速 kousoku (high velocity)". Therefore, in step A24, the modification is not performed. Herein, a diagram for modification in step A2-4 is omitted.

Subsequently, the ordering trees are non-ordered (step A2-5 in FIG. 8). Herein, in the tree structure of the sentence structure, words with a sibling relationship are sorted in the order of the Japanese syllabary, thereby non-ordering the ordering trees.

Incidentally, other methods for non-ordering the ordering trees may be used as follows.

Method for sorting words with the sibling relationship under a definite law other than the order of the Japanese syllabary Method for determining trees having an order of words with the sibling relationship as the identical one upon detecting the frequent similar pattern without sorting Among the generated partial structure and similar structure, the partial structure and the similar structure excluding similar structures 2a-1 and 2a-3 (refer to FIG. 20C) do not have any words with the sibling relationship. In the similar structures 2a-1 and 2a-3, the words that have already had the sibling relationship are arranged in the order of the Japanese syllabary. Therefore, the modification is not substantially performed. Herein, a diagram for modification in step A2-5 is thus omitted.

Finally, the similar structure is set as the equivalent class of the partial structure on the generation source, thereby generating the equivalent class (step A2-6 in FIG. 8).

Figure 21:
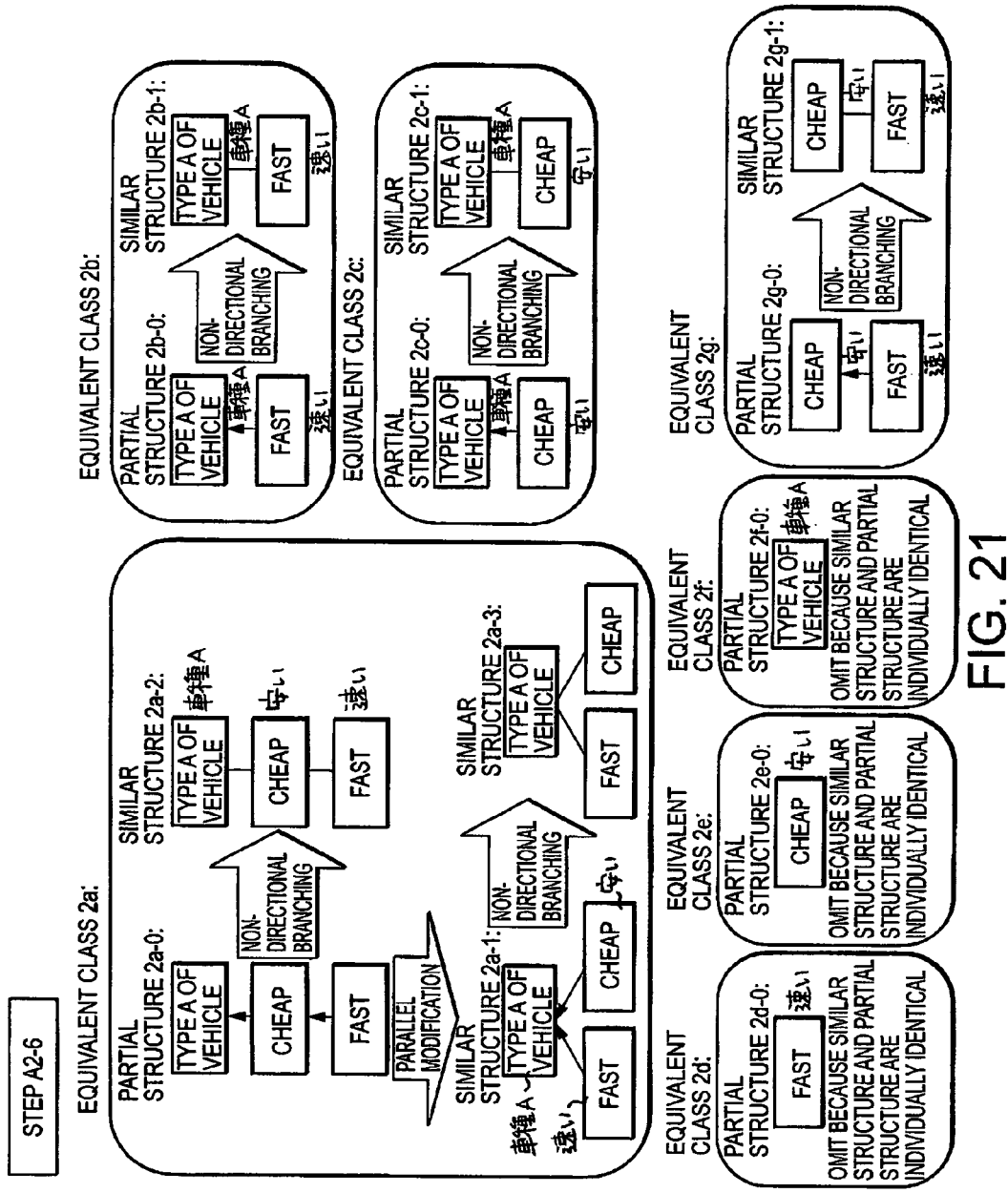
FIG. 21 is a diagram showing processing in step A2-6 in FIG. 8 according to the first to third examples of the present invention.

FIG. 21 shows the equivalent class generated by setting the similar structures as the equivalent class of the partial structure on the generation source in the set of the partial structures and similar structures shown in FIGS. 20A to 20E. An equivalent class 2a comprises the partial structure 2a-0, the similar structure 2a-a generated by performing the non-directional branching of the directional branch of the partial structure 2a-0, the similar structure 2a-1 obtained by parallel modifying the partial structure 2a-0, and the similar structure 2a-3 generated by performing the non-directional branching of the directional branch of the similar structure 2a-1.

An equivalent class 2b comprises the partial structure 2b-0, and the similar structure 2b-1 generated by performing the non-directional branching of the directional branch of the partial structure 2b-0. An equivalent class 2c comprises the partial structure 2c-0, and the similar structure 2c-1 generated by performing the non-directional branching of the directional branch of the partial structure 2c-0. An equivalent class 2g comprises the partial structure 2g-0, and the similar structure 2g-1 generated by performing the non-directional branching of the directional branch of the partial structure 2g-0. The partial structure 2d-0, 2e-0, and 2f-0 have the identical structure and the identical partial structure.

Referring to FIGS. 18 to 21, in the examples in which the similar-structure generating means 22 generates the equivalent classes from the sentence structures (refer to FIG. 16B) of the sentence 2, the modification is not performed in the replacement of the synonym (step A2-4 in FIG. 8) and the non-directional branching of ordering trees (step A2-5 in FIG. 8).

Figure 22:
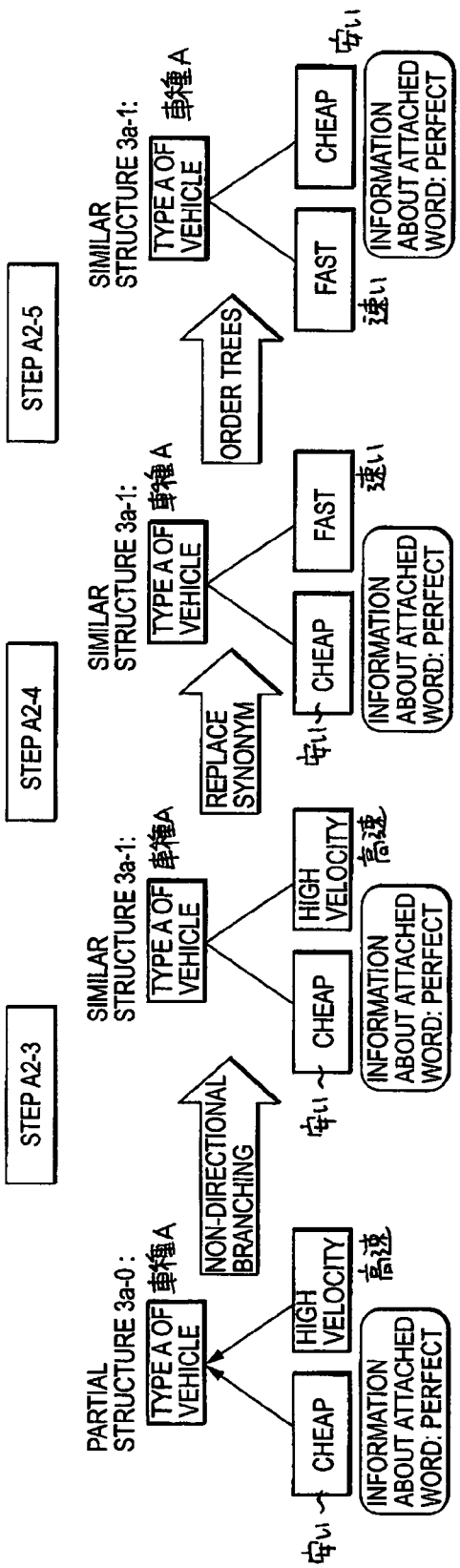
FIG. 22 is a diagram showing processing in which the similar-structure generating means 22 generates a similar structure of a partial structure 3a-0 containing the entire sentence structures of the sentence 3 according to the first and second examples of the present invention.

Referring to FIG. 22, the similar-structure generating means 22 performs modification processing of the partial structure of the sentence structure (refer to FIG. 16C) of the sentence 3. Hereinbelow, a description is given of the modification performed in the replacement of the synonym (step A2-4 in FIG. 8) and in the non-ordering of ordering trees (step A2-5 in FIG. 8).

First, the partial structure 3a-0 indicating the sentence structure of the sentence 3 is subjected to the parallel modification (step A2-1 in FIG. 8). Herein, the partial structure 3a-0 does not include the parallel structure and the modification is not performed. Therefore, referring to FIG. 22, the structure of the result of parallel modification is not included.

Subsequently, the partial structure is generated from the partial structure 3a-0 (step A2-2 in FIG. 8). Herein, since a description is given by paying attention only to the structure modification of the partial structure 3a-0, the generation of the partial structure serving as processing for generating another partial structure from the partial structure 3a-0 is omitted.

Subsequently, the directional branch is non-directional branched in the partial structure 3a-0 (step A2-3 in FIG. 8). The directional branch from ""安い yasui (cheap)" to ""車種A shashu A (type A of vehicle)" in the partial structure 3a-0 and the directional branch from ""高速 kousoku (high velocity)" to ""車種A shashu A (type A of vehicle)" are non-directional branched. Consequently, a similar structure 3a-1 is generated (step A2-3 in FIG. 22).

Subsequently, the synonym is replaced in the similar structure 3a-1 (step A2-4 in FIG. 8). Herein, since the synonym dictionary shown in FIG. 17 is used, the replaced word "kousoku (high velocity)" is replaced to the representative word ""速い hayai (fast)". Further, the replaced word ""高速 kousoku (high velocity)" included in the similar structure 3a-1 is also replaced to the representative word ""速い hayai (fast)" and the similar structure 3a-1 is modified to the similar structure (step A2-4 in FIG. 22).

Subsequently, the ordering trees are non-ordered in the similar structure 3a-1 (step A2-5 in FIG. 8). Herein, the words with the sibling relationship are sorted in the order of the Japanese syllabary, thereby non-ordering the ordering trees. Thus, in the similar structure 3a-1, the order of ""安い yasui (cheap)" and ""速い hayai (fast)" with the sibling relationship is replaced, and ""安い yasui (cheap)" and ""速い hayai (fast)" are sorted in the order of the Japanese syllabary, thereby realizing the conversion into the similar structure (step A2-5 in FIG. 22).

For the above-generated similar structure, the equivalent class is generated (step A2-6 in FIG. 8). Incidentally, in the examples, the description is given by paying attention only to the modification of one similar structure 3a-1 generated from the partial structure 3a-0 and a description thereof is thus omitted.

Figure 23:
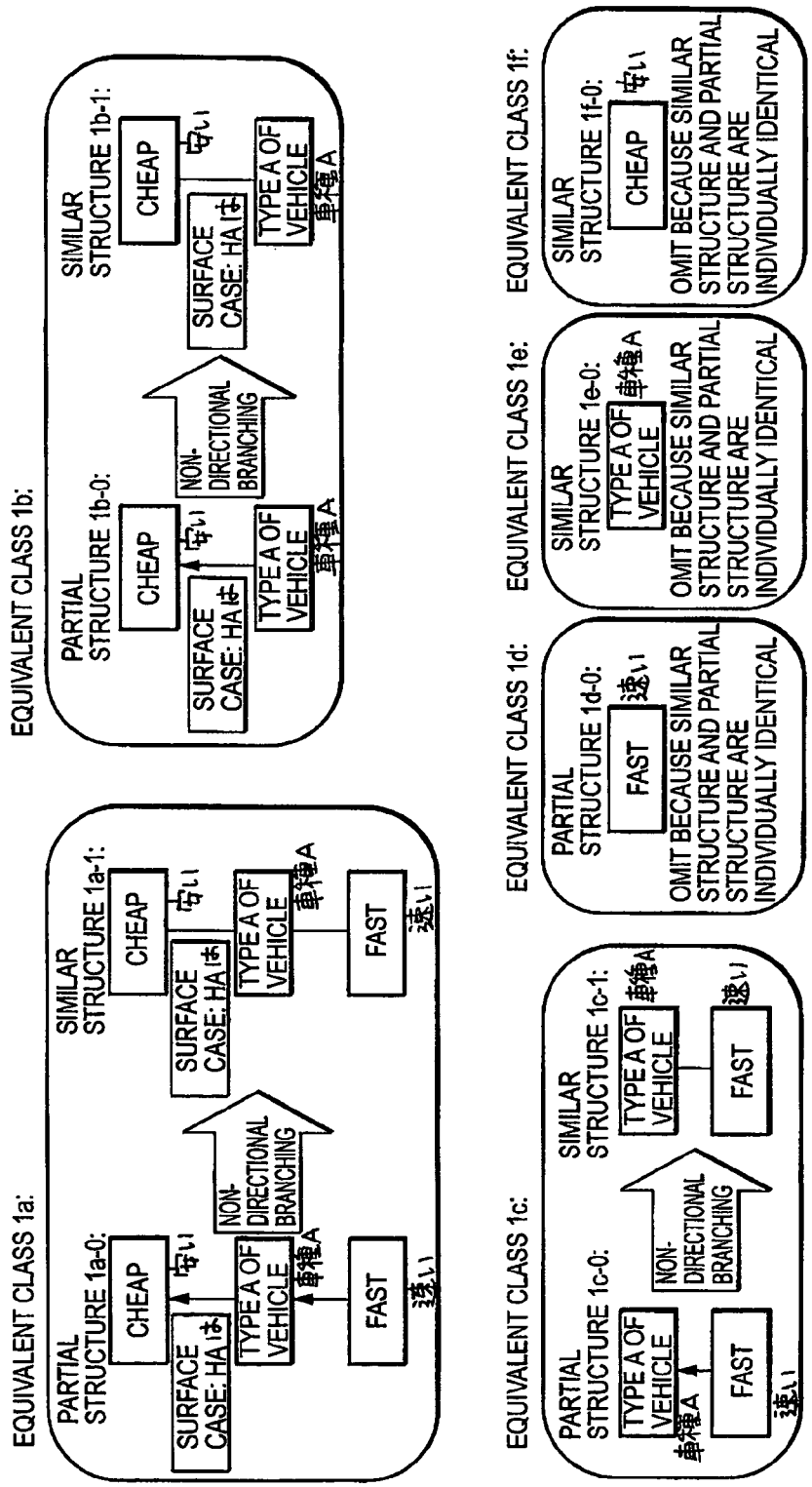
FIG. 23 is a diagram showing an equivalent class of a partial structure generated from a sentence structure of the sentence 1 according to the first to third examples of the present invention.
Figure 24:
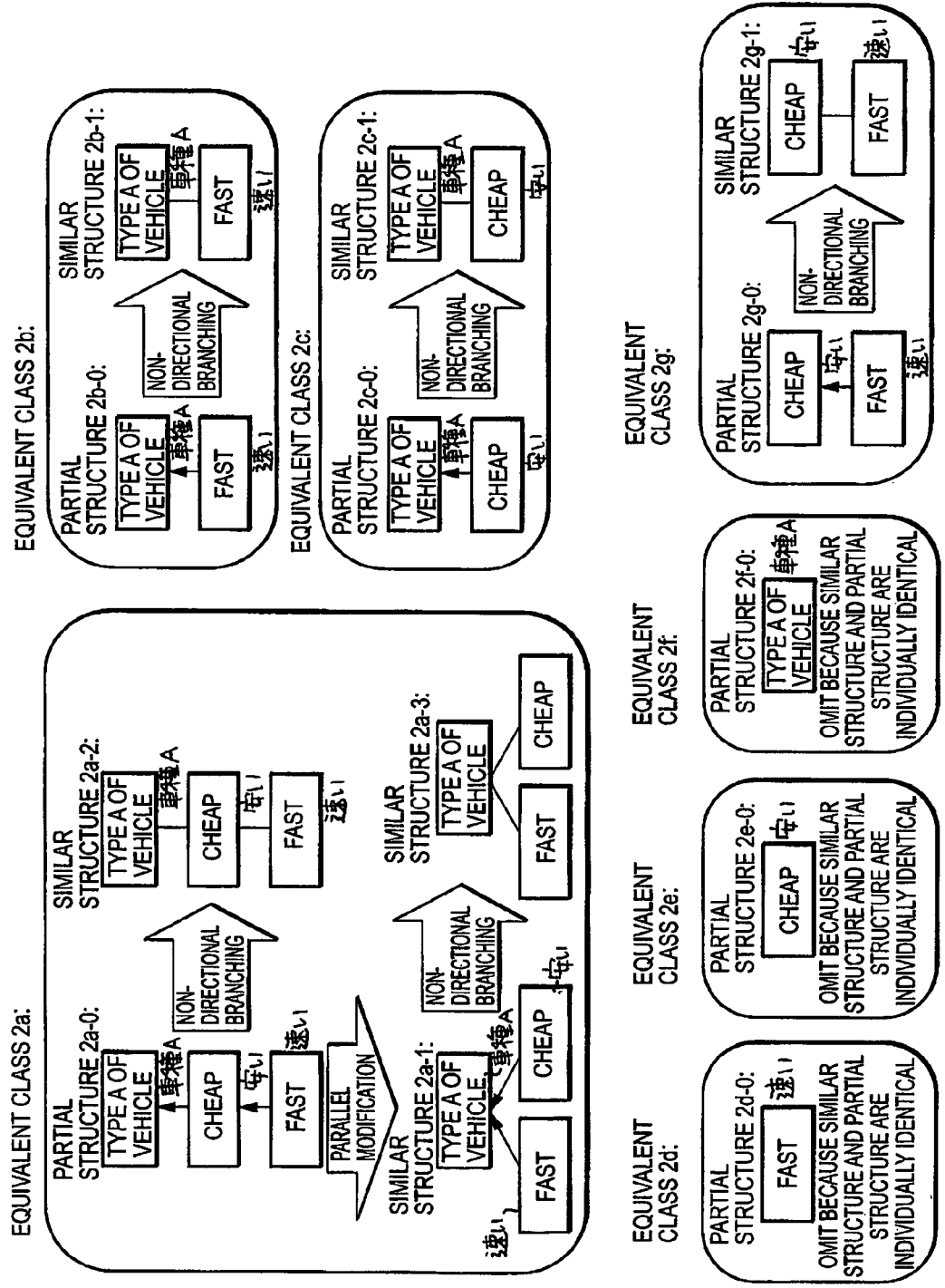
FIG. 24 is a diagram showing an equivalent class of a partial structure generated from a sentence structure of the sentence 2 according to the first to third examples of the present invention.
Figure 25:
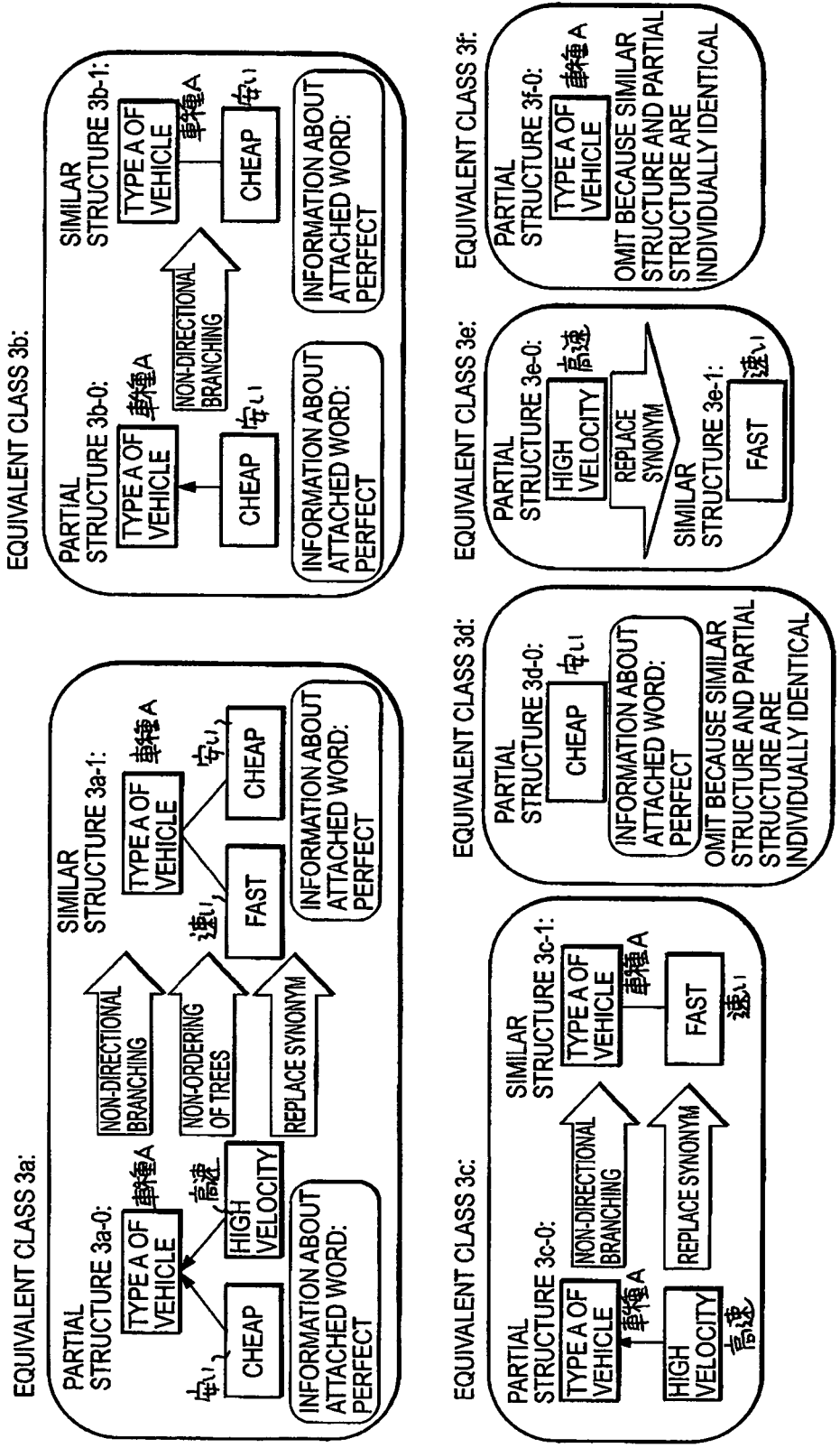
FIG. 25 is a diagram showing an equivalent class of a partial structure generated from a sentence structure of the sentence 3 according to the first and second examples of the present invention.

As mentioned above, the similar-structure generating means 22 generates the partial structure, the similar structure, and the equivalent class, thereby generating an equivalent class shown in FIG. 23 from the sentence structure of the sentence 1 in FIG. 16A in the examples. An equivalent class shown in FIG. 24 is generated from the sentence structure of the sentence 2 shown in FIG. 16B. Further, an equivalent class shown in FIG. 25 is generated from the sentence structure of the sentence 3 shown in FIG. 16C.

Originally, in the middle steps of the modification in FIG. 22 (the similar structure 3a-1 in steps A2-3 to step A2-4 FIG. 22), the similar structure having a different shape is generated. For the sake of a brief description, the structure that is not used for detecting the frequent pattern is omitted from the equivalent classes shown in FIGS. 23 to 25.

Subsequently, the frequent-pattern detection means 23 detects the frequent pattern (frequent equivalent class) from the set of equivalent classes shown in FIGS. 23 to 25 (step A3 in FIG. 7).

In this case, the frequent-pattern detection means 23 determines the equivalent classes having at least one identical element as the identical equivalent class and detects the frequent pattern.

For example, in the examples, in both a similar structure 1c-1 serving as an element of an equivalent class 1c shown in FIG. 23 and a similar structure 2b-1 of an equivalent class 2b shown in FIG. 24, ""車種A shashu A (type A of vehicle)" and ""速い hayai (fast)" are connected with a non-directional branch, and there is not the difference between the attribute values thereof. Both the similar structure 1c-1 shown in FIG. 23 and the similar structure 2b-1 shown in FIG. 24 have the identical structure.

Therefore, the frequent-pattern detection means 23 determines the equivalent class 1c shown in FIG. 23 and the equivalent class 2b shown in FIG. 24 as the identical equivalent class.

Referring to FIGS. 23 to 25,

"the similar structure 1c-1, the similar structure 2b-1, and the similar structure 3c-1", "a partial structure 1d-0, a partial structure 2d-0, and a similar structure 3e-1", "a partial structure 1e-0, a partial structure 2f-0, and a partial structure 3f-0", and "a partial structure 1f-0 and a partial structure 2e-0" have the identical structure.

On the basis of the feature of the equivalent class that "The equivalent classes having at least one identical element are determined as the identical equivalent class", among the equivalent classes shown in FIGS. 23 to 25, "the equivalent classes 1c, 2b, and, 3c", "the equivalent classes 1d, 2d, and, 3e", "the equivalent classes 1e, 2f, and, 3f", and "the equivalent classes 1f and 2e"

are determined as the identical equivalent classes.

In the examples, the equivalent class that appears at three or more times is determined as the frequent pattern. Before executing the text mining, a user can detect how many appearance times of the equivalent class as the frequent pattern.

In this case,

"the equivalent classes 1c, 2b, and 3c",

"the equivalent classes 1d, 2d, and 3e", and

"the equivalent classes 1e, 2f, and 3f"

are detected as the frequent patterns.

Finally, the structure indicating the frequent pattern extracted above is displayed on the output device 3 (step A4 in FIG. 7).

Figure 26:
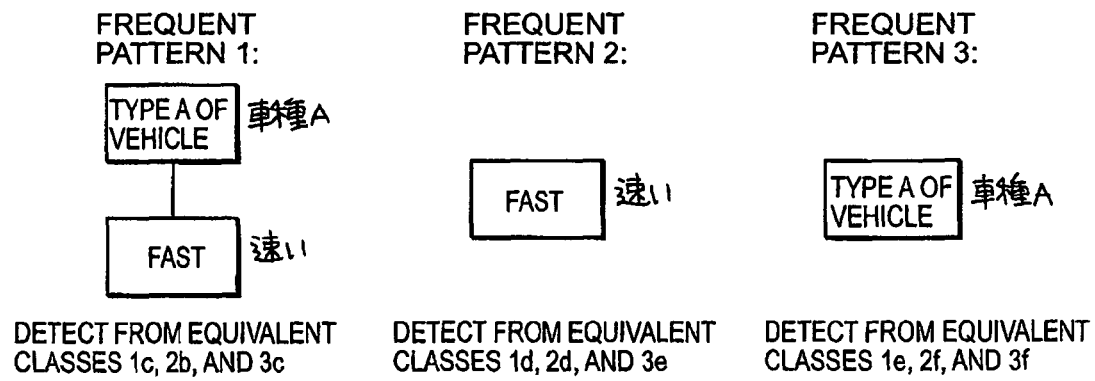
FIG. 26 is a diagram showing a frequent pattern detected from a set of equivalent classes shown in FIGS. 23 to 25 according to the first example of the present invention.

FIG. 26 is a diagram showing one example of the expression of the frequent pattern output by the output device 3 in the example. In the examples, the similar structure as the element of the equivalent class indicating the frequent pattern is used as the expression of the frequent pattern.

The similar structure is generated, the equivalent class is generated, and the frequent pattern is detected. As a consequence, the "partial structure 1c-0 (FIG. 23), the partial structure 2b-0 (FIG. 24), and the partial structure 3c-0 (FIG. 25)" having the similar meaning and different connecting configurations can be determined as the identical partial structure and can be detected as the frequent pattern.

Next, the second example of the present invention will be described with reference to the drawings. The second example corresponds to the second embodiment.

An apparatus in the second example comprises a personal computer instead of the data processing device 4, a magnetic disk storage device instead of the memory device 1, and a display instead of the output device 3.

The personal computer 4 comprises a central processing unit (CPU) functioning as the language analysis means 21, the similar-structure generating means 22, and the frequent-similar-pattern detection means 24. The magnetic disk storage device stores a set of texts as the text DB 11. Similarly to the first example, the sentences 1 to 3 shown in FIG. 15 are used as the set of texts.

The language analysis means 21 analyzes the language of each text in the set of texts shown in FIG. 15 in the text DB 11, and obtains the sentence structure of each text (step A1 in FIG. 10). The sentence structures obtained here are as shown in FIGS. 16A to 16C, similarly to the first example.

Subsequently, the similar-structure generating means 22 generates all similar structures of the partial structures forming the sentence structures shown in FIGS. 16A to 16C and consequently sets the generated similar structure as the equivalent class of the partial structure on the generation source (step A2 in FIG. 10). The equivalent classes obtained here are as shown in FIGS. 23 to 25, similarly to the first example.

Further, the frequent-similar-pattern detection means 24 detects the frequent pattern (frequent equivalent class) by ignoring the difference between the attribute values from the set of equivalent classes shown in FIGS. 23 to 25 (step B3 in FIG. 10).

The frequent-similar-pattern detection means 24 determines the equivalent classes having at least one identical element as the identical equivalent class and detects the frequent pattern. However, the frequent-similar-pattern detection means 24 in the second example determines the similar structures as the identical structure by ignoring the difference between the surface cases or the difference between the attribute values of the information about the attached word. In view of this point, the frequent-similar-pattern detection means 24 is different from the frequent-pattern detection means 23 in the first example.

For example, both the similar structure 1*a*-1 shown in FIG. 23 and the similar structure 2*a*-3 shown in FIG. 24 have a connecting configuration of ""車種A shashu A (type A of vehicle)", ""速い hayai (fast)", and ""安い yasui (cheap)" with non-directional branches. However, since the surface cases are different, the frequent-pattern detection means 23 in the first example does not determine the similar structures as the identical one. On the other hand, the frequent-similar-pattern detection means 24 in the second example determines the similar structures as the identical one.

In the second example, referring to FIGS. 23 to 25, the frequent-similar-pattern detection means 24 individually determines, as the identical structures, "the similar structure 1*a*-1, the similar structure 2*a*-3, and the similar structure 3*a*-1", "the similar structure 1*b*-1, the similar structure 2*c*-1, and the similar structure 3*b*-1", "the similar structure 1*c*-1, the similar structure 2*b*-1, and the similar structure 3*c*-1", "the partial structure 1*d*-0, the partial structure 2*d*-0, and the similar structure 3*e*-1", "the partial structure 1*e*-0, the partial structure 2*f*-0, and the partial structure 3*f*-0", and "the partial structure 1*f*-0, the partial structure 2*e*-0, and the partial structure 3*d*-0".

The frequent-similar-pattern detection means 24 determines the equivalent classes having at least one identical element as the identical equivalent classes and therefore individually determines, as the identical equivalent classes, "the equivalent classes 1*a*, 2*a*, and 3*a*", "the equivalent classes 1*b*, 2*c*, and 3*b*", "the equivalent classes 1*c*, 2*b*, and 3*c*", "the equivalent classes 1*d*, 2*d*, and 3*e*", "the equivalent classes 1*e*, 2*f*, and 3*f*", and "the equivalent classes 1*f*, 2*e*, and 3*d*".

In the second example, similarly to the first example, the equivalent class that appears three or more times is determined as the frequent pattern. In this case, "the equivalent classes 1*a*, 2*a*, and 3*a*", "the equivalent classes 1*b*, 2*c*, and 3*b*", "the equivalent classes 1*c*, 2*b*, and 3*c*", "the equivalent classes 1*d*, 2*d*, and 3*e*", "the equivalent classes 1*e*, 2*f*, and 3*f*", and "the equivalent classes 1*f*, 2*e*, and 3*d*"

are detected as the frequent patterns.

Finally, the structure indicating the above-extracted frequent pattern is displayed on the output device 3 (step A4 in FIG. 10).

Figure 27:
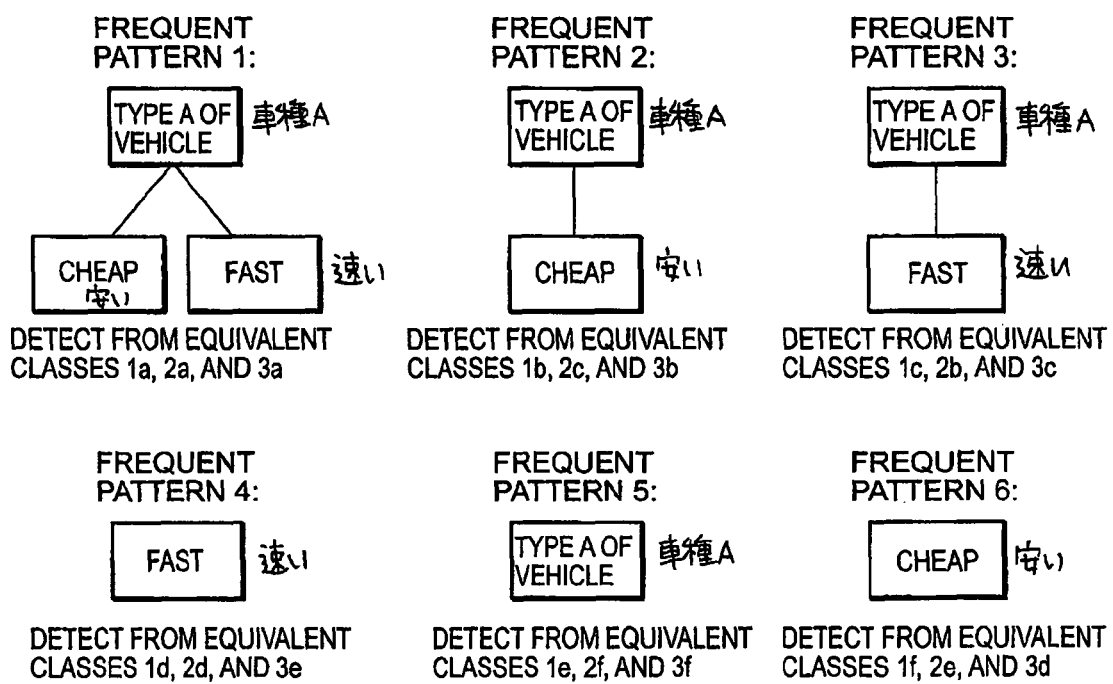
FIG. 27 is a diagram showing a frequent pattern detected from a set of equivalent classes shown in FIGS. 23 to 25 according to the second examples of the present invention.

In the second example, the frequent pattern output by the output device 3 is expressed as shown in FIG. 27. In the second example, similarly to the first example, the similar structure serving as the element of the equivalent class indicating the frequent pattern is used as the expression of the frequent pattern.

As mentioned above, the difference between the attribute values is ignored and the frequent pattern is detected, the following partial structures having the similar meaning and different attribute values are thus determined as the identical partial structures. That is, "the partial structure 1*b*-0 (FIG. 23), the partial structure 2*c*-0 (FIG. 24), and the partial structure 3*b*-0 (FIG. 25)", and "the partial structure 1*f*-0 (FIG. 23), the partial structure 2*e*-0 (FIG. 24), and the partial structure 3*f*-0 (FIG. 25)".

The partial structures can be detected as the frequent patterns.

Next, a description is given of the third example of the present invention with reference to the drawings. The third example corresponds to the third embodiment of the present invention.

An apparatus in the third example comprises a personal computer instead of the data processing device 5, a magnetic disk storage device instead of the memory device 1, a display instead of the output device 3, and a keyboard instead of the input device 6.

The personal computer comprises a central processing unit (CPU) functioning as the language analysis means 21, the similar-structure generating means 22, the frequent-similar-pattern detection means 24, the similar-structure generation adjustment means 25, and the similar-structure determination adjustment means 26. The magnetic disk storage device stores a set of texts as the text DB 11. The sentences shown in FIG. 15 are used as the set of texts, similarly to the first and second examples.

The language analysis means 21 analyzes the language of each text in the set of texts shown in FIG. 15 in the text DB 11, and obtains the sentence structures of the individual texts (step A1 in FIG. 12). The sentence structures obtained here are as shown in FIGS. 16A to 16C, similarly to the first and second examples.

Subsequently, a user performs, with the input device, (in step C1 in FIG. 12), input operation for determining whether or not the structures are identical every type of differences between the sentence structures, and input operation for determining whether or not the difference between the attribute values is ignored every type of attribute values.

In the third example, e.g., it is assumed that

"it is determined that, with respect to the difference between the connecting configurations, if the difference between the dependency directions and the difference between the dependency order exist, the connecting configurations are identical, and it is not determined that if the difference due to the synonym replacement exists, the connecting configurations are not identical. With respect to the difference between the attribute values, if the difference between the information about the attached word and the difference between the surface cases exist, it is determined that the connecting configurations are identical".

The input device 6 sends the inputs received from the user to the similar-structure generation adjustment means 25 and the similar-structure determination adjustment means 26.

Subsequently, the similar-structure generation adjustment means 25 receives the user determination from the input device 6, and adjusts the operation of the similar-structure generating means 22 (step C2 in FIG. 12).

In the third example, the similar-structure generation adjustment means 25 receives from the input device 6, "with respect to the difference between the connecting configurations, if the difference between the dependency directions and the difference between the dependency orders exist, it is determined the connecting configurations are identical and if the difference due to the synonym replacement exists, it is not determined that the connecting configurations are identical. With respect to the difference between the attribute values, if the difference between the information about the attached word and the difference between the surface cases exist, it is determined that the connecting configurations are identical".

In this case, the similar-structure generating means 22 executes modification processing upon generating the similar structure from the partial structure of the sentence structure, i.e., the modification of the parallel structure (step A2-1 in FIG. 13), the non-directional branching of directional branches (step A2-3 in FIG. 13), and the non-ordering of ordering trees (step A2-5 in FIG. 13). However, the similar-structure generation adjustment means 25 adjusts the operation of the similar-structure generating means 22 so that the synonym replacement (step A24 in FIG. 13) is skipped.

On the other hand, the similar-structure determination adjustment means 26 receives the user inputs from the input device 6, and adjusts the operation of the frequent-similar-pattern detection means 24 (step C2 in FIG. 12).

In the third example, the similar-structure determination adjustment means 26 determines on the basis of information from the input device 6 that "with respect to the difference between the connecting configurations, if the difference between the dependency directions and the difference between the dependency orders exist, the connecting configurations are identical, and if the difference due to the synonym replacement exists, it is not determined that the connecting configurations are identical.

With respect to the difference between the attribute values, the similar-structure determination adjustment means 26 receives the determination indicating that if the difference between the information about the attached word and the difference between the surface cases exist, it is determined the attribute values are identical", and further adjusts the operation so that the frequent-similar-pattern detection means 24 performs the processing for determining whether or not the attribute values are identical by ignoring the difference between the surface cases and the difference between the information about the attached word.

Subsequently, the similar-structure generating means 22 skips the synonym replacement (step A2-4 in FIG. 13) in accordance with the determination items of the partial structures of the sentence structures shown in FIGS. 16A to 16C, generated in step C2, and generates the similar structure. As a consequence, the similar-structure generating means 22 sets the generated similar structure as the equivalent class of the partial structure on the generation source (step C3 in FIG. 12).

Figure 28:
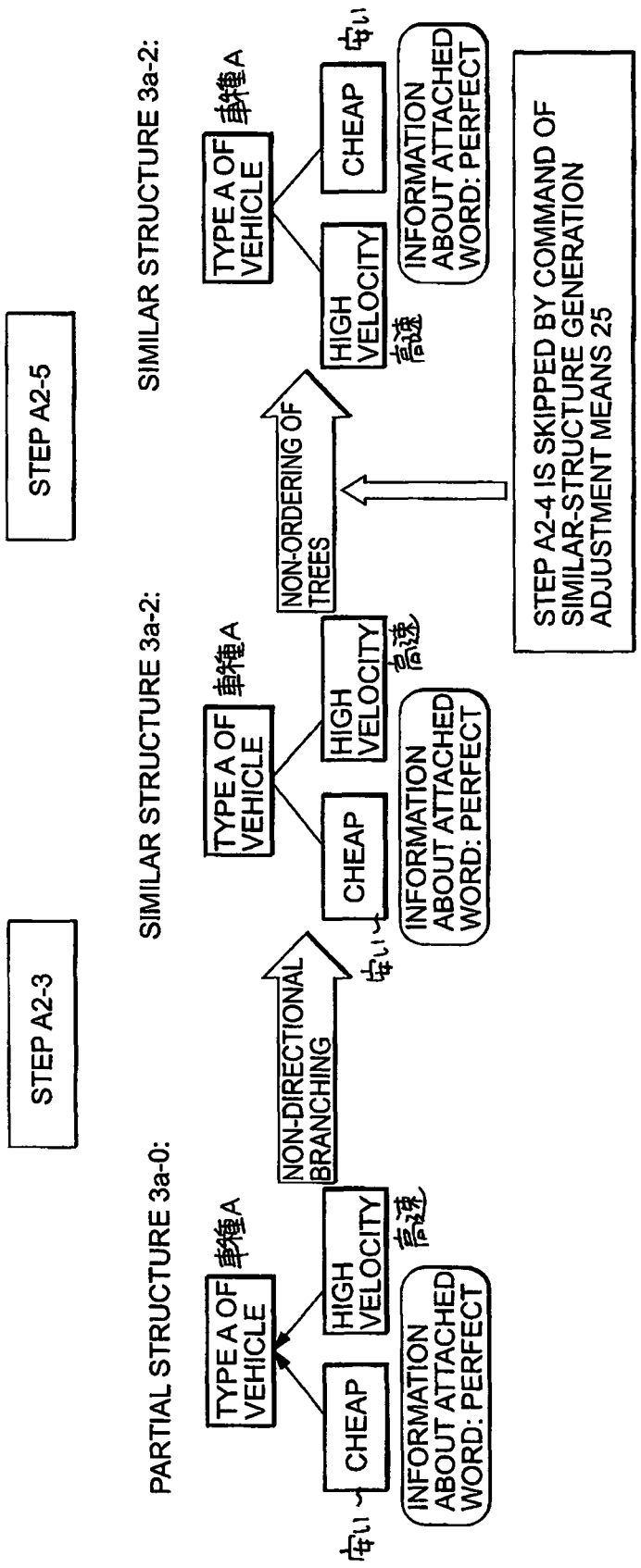
FIG. 28 is a diagram showing processing in which the similar-structure generating means 22 generates a structure similar to the partial structure 3a-0 containing the entire sentence structures of the sentence 3 according to the third example of the present invention.

Hereinbelow, a description is given of the modification of one partial structure of the sentence structure of the sentence 3 shown in FIG. 16C, which is performed by the similar-structure generating means 22, as an example. FIG. 28 shows an example thereof.

First, the partial structure 3a-0 indicating the sentence structure of the sentence 3 is subjected to the parallel modification (step A2-1 in FIG. 13). However, in the example shown in FIG. 28, the partial structure 3a-0 does not include the parallel structure and the modification is not executed. Therefore, the example shown in FIG. 28 does not include the structure as the result of the parallel modification.

Subsequently, the partial structure is generated from the partial structure 3a-0 (step A2-2 in FIG. 13). Since a description is given by paying attention to the structure modification that is performed to the partial structure 3a-0, the generation of the partial structure, serving as processing for generating another partial structure from the partial structure 3a-0, is omitted.

Subsequently, the directional branch of the partial structure 3a-0 is subjected to the non-directional branching (step A2-3 in FIG. 13). The directional branch from ""安い yasui (cheap)" to ""車種A shashu A (type A of vehicle)" in the partial structure 3a-0 and the directional branch from ""高速 kousoku (high velocity)" to ""車種A shashu A (type A of vehicle)" are non-directional branched. As a consequence, the similar structure 3a-2 is generated (step A2-3 in FIG. 28).

The synonym replacement (step A24 in FIG. 13) is skipped in the determination in step C3-3 on the basis of the determination given from the similar-structure generation adjustment means 25 and is not therefore executed.

Subsequently, the ordering trees of the similar structure 3a-2 are non-ordered (step A2-5 in FIG. 13). Herein, words with the sibling relationship are sorted in the order of the Japanese syllabary, thereby non-ordering the ordering trees. In the similar structure 3a-2 (similar structure after the processing in step A2-3 in FIG. 28), the words are sorted in the order of the Japanese syllabary so as to exchange the order of the words ""安い yasui (cheap)" and ""高速 kousoku (high velocity)" with the sibling relationship. As a consequence, the similar structure 3a-2 is converted into the similar structure after the processing in step A2-5 in FIG. 28.

The equivalent class of the above-generated similar structure is generated (step A2-6 in FIG. 13). The description is omitted because attention is paid only the modification of one similar structure 3a-2 generated from the partial structure 3a-0 and a specific description thereof is omitted.

In the modification in the third example, since the synonym replacement (step A2-4 in FIG. 13) is skipped, the similar structure 3a-2 after the processing in step A2-5 in FIG. 28 has the remaining replaced word ""高速 kousoku (high velocity)". On the other hand, the example of the modification in the first and second examples shown in FIG. 22, i.e., the replaced word ""高速 kousoku (high velocity)" is replaced to the representative word ""速い hayai (fast)" in the similar structure 3a-1 after the processing in step A2-5.

Figure 29:
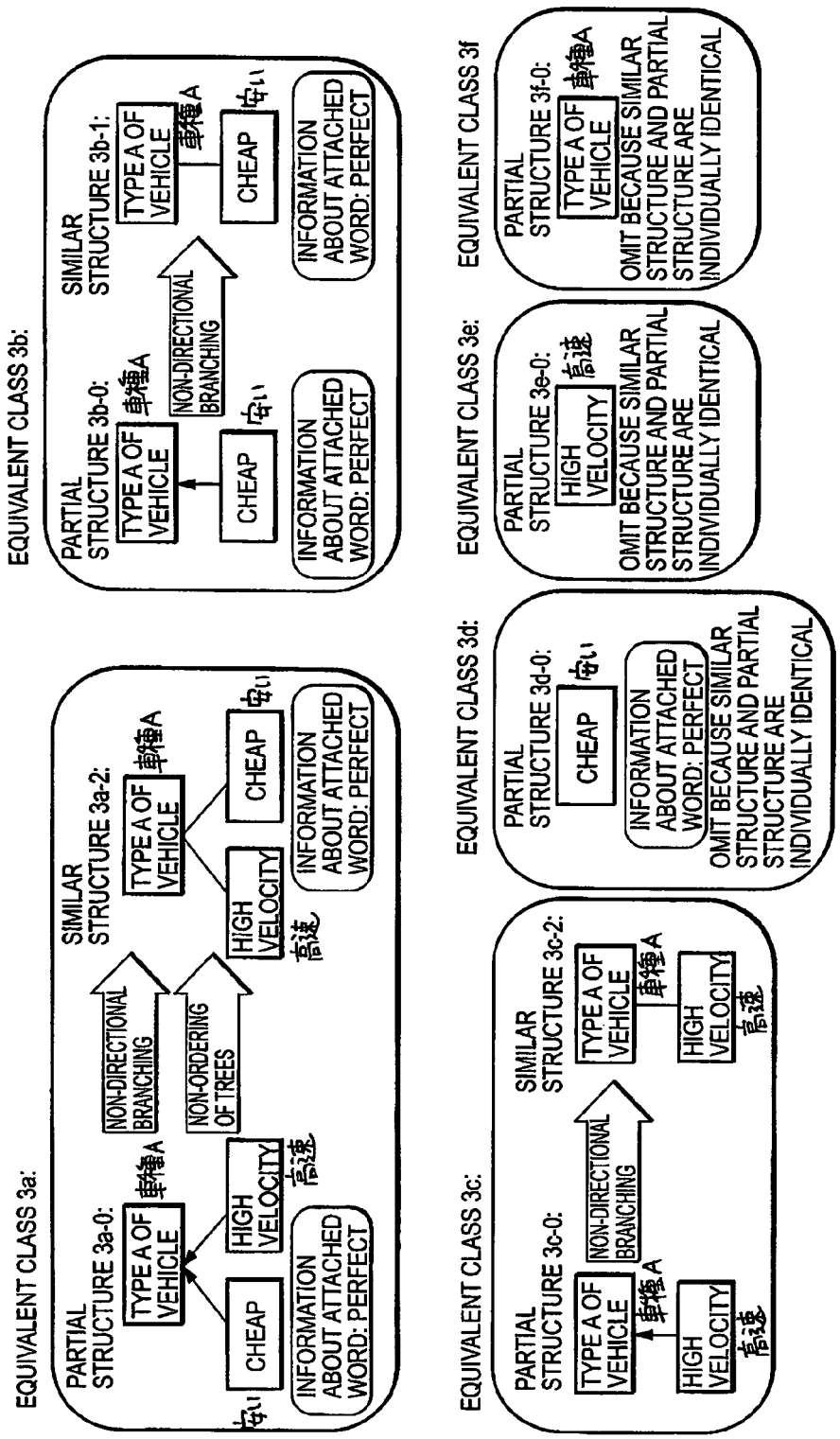
FIG. 29 is a diagram showing an equivalent class of a partial structure generated by a sentence structure of the sentence 3 according to the third example of the present invention.

In the third example, as mentioned above, the similar-structure generating means 22 generates the partial structure, the similar structure, and the equivalent class. Thus, the equivalent class shown in FIG. 23 is generated from the sentence structure of the sentence 1 shown in FIG. 16A. Further, the equivalent class shown in FIG. 24 is generated from the sentence structure of the sentence 2 shown in FIG. 16B. Furthermore, the equivalent class shown in FIG. 29 is generated from the sentence structure of the sentence 3 shown in FIG. 16C.

Subsequently, the frequent-similar-pattern detection means 24 detects the frequent pattern from the set of the equivalent classes shown in FIGS. 23, 24, and 29 by ignoring the difference between the attribute values determined by the similar-structure determination adjustment means 26 in step C2 (step C4 in FIG. 12).

The frequent-similar-pattern detection means 24 determines the equivalent classes having at least one identical element as the identical equivalent class, and detects the frequent pattern.

In the third example, the frequent-similar-pattern detection means 24 determines, on the basis of the determination of the similar-structure determination adjustment means 26, the difference between which attribute values is ignored and whether or not the similar structures are identical.

In the third example, the similar-structure determination adjustment means 26 determines the similar structures as the identical structure so as to adjust the operations for "ignoring the difference between the surface cases", and "ignoring the difference between the information about the attached word". Therefore, the frequent-similar-pattern detection means 24 determines whether or not the similar structures are identical, similarly to the second example.

In the third example, referring to FIGS. 23, 24, and 29, the frequent-similar-pattern detection means 24 individually determines, as the identical structures, "the similar structure 1$a$-1 and the similar structure 2$a$-3", "the partial structure 2$c$-0 and the partial structure 3$b$-0", "the similar structure 1$b$-1, the similar structure 2$c$-1, and the similar structure 3$b$-1", "the partial structure 1$c$-0 and the similar structure 2$b$-0", "the similar structure 1$c$-1 and the similar structure 2$b$-1", "the partial structure 1$d$-0 and the partial structure 2$d$-0", "the partial structure 1$e$-0, the partial structure 2$f$-0, and the partial structure 3$f$-0", and "the partial structure 1$f$-0, the partial structure 2$e$-0, and the partial structure 3$d$-0".

The frequent-similar-pattern detection means 24 determines the equivalent classes having at least one identical element as the identical equivalent class and thus individually determines, as the identical equivalent classes, "the equivalent classes 1$a$, 2$a$, and 3$a$", "the equivalent classes 1$b$, 2$c$, and 3$b$", "the equivalent classes 1$c$, 2$b$, and 3$c$", "the equivalent classes 1$d$, 2$d$, and 3$e$", "the equivalent classes 1$e$, 2$f$, and 3$f$", and "the equivalent classes 1$f$, 2$e$, and 3$d$".

In the third example, similarly to the first and second examples, the equivalent class that appears three or more times is determined as the frequent pattern.

In this case,

"the equivalent classes 1$b$, 2$c$, and 3$b$",

"the equivalent classes 1$e$, 2$f$, and 3$f$", and

"the equivalent classes 1$f$, 2$e$, and 3$d$"

are detected as the frequent patterns.

Finally, the structures indicating the frequent pattern as extracted above are displayed on the output device 3 (step A4 in FIG. 12).

Figure 30:
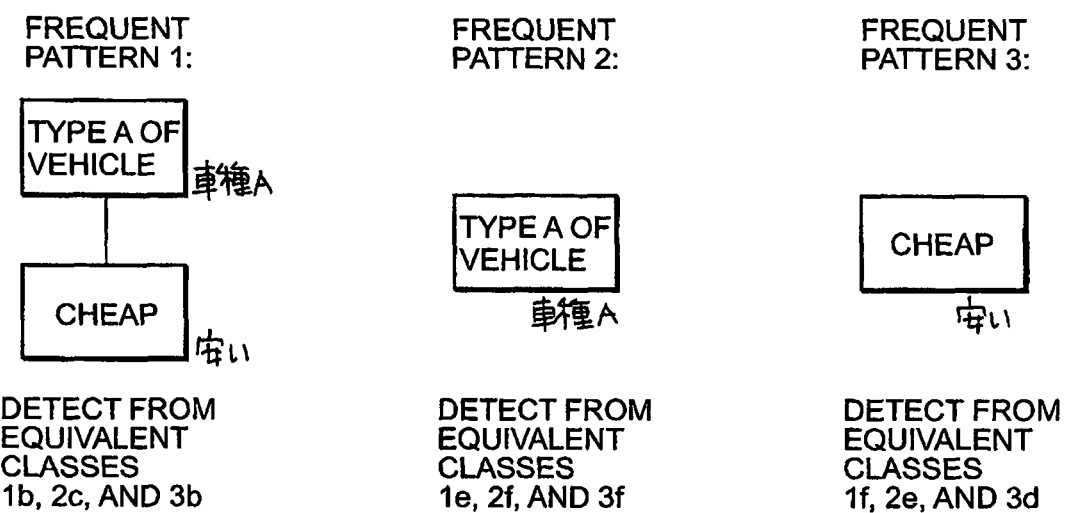
FIG. 30 is a diagram showing a frequent pattern detected from a set of equivalent classes shown in FIGS. 23, 24, and 29 according to the third example of the present invention.

In the third example, the frequent pattern output by the output device 3 is expressed as shown in FIG. 30. Referring to FIG. 30, in the third example, similarly to the first and second examples, the similar structure serving as the element of the equivalent class indicating the frequent pattern is used as the expression of the frequent pattern.

When a user has a complaint about the detection of the frequent pattern, the processing returns to step C1 in FIG. 12 whereupon the input for determining how similar structures are identical is changed, thereby detecting the frequent pattern again.

As mentioned above, on the basis of the user determination,

"if the difference due to the synonym replacement exists, it is not determined that the structures are identical", referring to FIGS. 23, 24, and 29, "the partial structure 1$a$-0, the partial structure 2$a$-0, and the partial structure 3$a$-0", "the partial structure 1$c$-0, the partial structure 2$b$-0, and the partial structure 3$c$-0", and "the partial structure 1$d$-0, the partial structure 2$d$-0, and the partial structure 3$e$-0"

that have the similar manning and are different from the user inputs are not determined as the identical structures and the frequent pattern is detected. Thus, the user can adjust the determination as how similar structures are identical.

According to the present invention, it is possible to determine the structures having different connecting configurations and the similar meanings as the identical structure and to detect the frequent pattern. Further, according to the present invention, it is possible to determine, as the identical structure, the similar structures of the set of structures without the attribute value and to detect the frequent pattern.

Because the generated similar structure is used as the equivalent class of the original structure and the frequent pattern is detected according to the present invention. According to the present invention, it is possible to determine the similar structures of the set of the structures having the attribute value as the identical structures and to detect the frequent pattern.

Further, according to the present invention, it is possible to determine the structures having the similar meaning and different attribute values as the identical structure and to detect the frequent pattern.

Because, according to the present invention, the frequent-similar-pattern detection means ignores the difference between the attribute values and detects the frequent pattern.

Furthermore, according to the present invention, it is possible to adjust the operation so that the user of the text mining apparatus determines how similar structures are identical and to detect the frequent pattern.

Because, according to the present invention, the similar-structure generation adjustment means and the similar-structure determination adjustment means adjust, on the basis of the inputs from the user, the operation for determining how similar structures are identical.

Industrial Applicability

The present invention can be applied to a text mining apparatus that is frequently used to analyze features of a complaint email or survey result from a client, stored on a computer, and a program for enabling the computer to form the text mining apparatus.

The invention claimed is:

1. A text mining apparatus comprising:
   means for generating a sentence structure from an input document, the sentence structure representing a dependency among words;
   means for generating a similar structure of patterns having a similar meaning of a partial structure of the sentence structure by performing predetermined conversion operation, including at least change in connection of branches in a graph structure, of the partial structure; and means for determining the patterns having the similar meaning as the identical pattern and detecting the patterns, wherein the means for generating the similar structure comprises:

means for performing parallel modification of the sentence structure, the parallel modification being structure modification including new branch generation for a particular one of nodes corresponding to the words put in a parallel relationship in the sentence structure so that the particular one is connected to each node connected by a branch from the node put in the parallel relationship for the particular one, said means for performing parallel modification of the sentence structure generating the similar structure;

means for generating a plurality of new partial structures of the sentence structure from the partial structure and the similar structure;

means for performing non-directional branching of a directional branch of the sentence structure and the plurality of new partial structures to produce new similar structures;

means for replacing a synonym in the sentence structure and the plurality of new partial structures by referring to a synonym dictionary to produce new similar structures; and means for performing non-ordering of ordering trees of the sentence structure and the plurality of new partial structures to produce new similar structures, and wherein the means for generating the similar structure uses the new similar structures as an equivalent class of the plurality of new partial structures of the sentence structure.

2. A text mining apparatus according to claim 1, further comprising:

a storage unit that stores a set of documents as a text mining object; and an analyzing unit that inputs and analyzes the document of the storage unit and obtains the sentence structure, wherein the analyzing unit analyzes the document, and generates the sentence structure containing a clause having a node and indicating at least a dependency as a directional branch from the node on a modifier to the node on a modifiee.

3. A text mining apparatus comprising:

a storage unit that stores a set of documents as a text mining object;

an analyzing unit that reads and analyzes the document from the storage unit and obtains a sentence structure representing a dependency among words;

a similar-structure generating unit that performs predetermined modification operation, including at least change in connection of branches in a graph structure, of the partial structure of the sentence structure obtained by the analysis of the analyzing unit, and generates a similar structure of patterns having a similar meaning; and a pattern detecting unit that uses the similar structure generated by the similar-structure generating unit as an equivalent class of the partial structure on the generation source, and detects the pattern, wherein the similar-structure generating unit comprises:

means for performing parallel modification of the sentence structure, the parallel modification being structure modification including new branch generation for a particular one of nodes corresponding to the words put in a parallel relationship in the sentence structure so that the particular one is connected to each node connected by a branch from the node put in the parallel relationship for the particular one, said means for performing parallel modification of the sentence structure generating the similar structure;

means for generating a plurality of new partial structures of the sentence structure from the partial structure and the similar structure;

means for performing non-directional branching of a directional branch of the sentence structure and the plurality of new partial structures to produce new similar structures;

means for replacing a synonym in the sentence structure and the plurality of new partial structures by referring to a synonym dictionary to produce new similar structures; and means for performing non-ordering of ordering trees in the sentence structure and the plurality of new partial structures to produce new similar structures, and wherein the similar-structure generating unit generates the new similar structures of the sentence structure and sets the new similar structures as an equivalent class of the plurality of new partial structures of the sentence structure.

4. A text mining apparatus according to claim 3, wherein the pattern detecting unit uses the new similar structures as the equivalent class of the plurality of new partial structures on the generation source, and detects the pattern.

5. A text mining apparatus according to claim 3, further comprising:

means for adjusting the operation so that a user determines how similar patterns are identical and detecting the pattern.

6. A text mining apparatus comprising:

a storage unit that stores a set of documents as a text mining object;

an analyzing unit that reads and analyzes the document from the storage unit and obtains a sentence structure representing a dependency among words;

a similar-structure generation adjustment unit that generates a first determination item for determining, from a user input, whether or not the structures are identical ones for every type of differences between the sentence structures;

a similar-structure determination adjustment unit that generates a second determination item for determining, from a user input, whether or not the structures are identical ones for every type of differences between attribute values;

a similar-structure generating unit that performs predetermined conversion operation of a partial structure of the sentence structure obtained by the analyzing unit in accordance with the first determination item generated by the similar-structure generation adjustment unit and generates similar structures having a similar meaning of the partial structure; and a similar-pattern detecting unit that uses the similar structure generated by the similar-structure generating unit as an equivalent class of the partial structure on the generation source and detects the frequent pattern by ignoring the difference between the attribute values in accordance with the second determination item of the similar-structure determination adjustment unit, wherein the similar-structure generating unit comprises:

means for performing parallel modification of the sentence structure when the first determination item determines the parallel modification, the parallel modification being structure modification including new branch generation for a particular one of nodes corresponding to the words put in a parallel relationship in the sentence structure so that the particular one is connected to each node connected by a branch from the node put in the parallel relationship for the particular one, said means for performing parallel modification of the sentence structure generating the similar structure;

means for generating a plurality of new partial structures of the sentence structure from the partial structure and the similar structure;

means for performing non-directional branching of a directional branch of the sentence structure and the plurality of new partial structures when the first determination item determines the non-directional branching of the directional branch to produce new similar structures;

means for replacing a synonym in the sentence structure and the plurality of new partial structures by referring to a synonym dictionary when the first determination item includes replacement of the synonym to produce new similar structures; and means for performing non-ordering of ordering trees of the sentence structure and the plurality of new partial structures when the first determination item determines the non-ordering of the ordering trees to produce new similar structures, and wherein the similar-structure generating unit generates the new similar structures of the sentence structure and sets the new similar structures as the equivalent class of the plurality of new partial structures of the sentence structure.

7. A text mining apparatus according to claim 6, wherein the analyzing unit analyzes the document, and generates the sentence structure containing a clause having a node and indicating at least a dependency as a directional branch from the node on a modifier to the node on a modifiee determination, and the attribute value includes the surface case and/or the information about the attached word, added to the sentence structure.

8. A text mining apparatus according to claim 6, wherein the similar-pattern detecting unit detects a frequent similar pattern.

9. A text mining method comprising:

a step of generating, using a computer, a sentence structure from an input document, the sentence structure representing a dependency among words;

a step of generating, using the computer, a similar structure of patterns having a similar meaning of a partial structure of the sentence structure by performing predetermined conversion operation, including at least change in connection of branches in a graph structure, of the partial structure; and a step of determining the patterns having the similar meaning as the identical pattern and detecting the patterns, wherein the step of generating the similar structure comprises:

a step of performing parallel modification of the sentence structure, the parallel modification being structure modification including new branch generation for a particular one of nodes corresponding to the words put in a parallel relationship in the sentence structure so that the particular one is connected to each node connected by a branch from the node put in the parallel relationship for the particular one, said step of performing parallel modification of the sentence structure generating the similar structure;

a step of generating a plurality of new partial structures of the sentence structure from the partial structure and the similar structure;

a step of performing non-directional branching of a directional branch of the sentence structure and the plurality of new partial structures to produce new similar structures;

a step of replacing a synonym in the sentence structure and the plurality of new partial structures by referring to a synonym dictionary to produce new similar structures; and a step of performing non-ordering of ordering trees in the sentence structure and the plurality of new partial structures to produce new similar structures, and thereby the step of generating the similar structure setting new similar structures as an equivalent class of the plurality of new partial structures.

10. A text mining method according to claim 9, further comprising:

a step of inputting and analyzing the document from a storage unit that stores a set of documents as a text mining object and generating the sentence structure containing a clause having a node and indicating at least a dependency as a directional branch from the node on a modifier to the node on a modifiee.

11. A text mining method comprising:

a step of analyzing a document from a storage unit that stores a set of documents as a text mining object and obtaining a sentence structure representing a dependency among words;

a step of performing predetermined modification operation, including at least change in connection of branches in a graph structure, of a partial structure of the sentence structure and generating, using a computer, a similar structure having patterns with a similar meaning;

a step of using the generated similar structures as an equivalent class of the partial structure on the generation source and detecting the pattern, wherein the step of generating the similar structure comprises:

a step of performing parallel modification of the sentence structure, the parallel modification being structure modification including new branch generation for a particular one of nodes corresponding to the words put in a parallel relationship in the sentence structure so that the particular one is connected to each node connected by a branch from the node put in the parallel relationship for the particular one said step of performing parallel modification of the sentence structure generating the similar structure;

a step of generating a plurality of new partial structures of the sentence structure from the partial structure and the similar structure;

a step of performing non-directional branching of the directional branch of the sentence structure and the plurality of new partial structures to produce new similar structures;

a step of replacing a synonym in the sentence structure and the plurality of new partial structures by referring to a synonym dictionary to produce new similar structures; and a step of performing non-ordering of ordering trees in the sentence structure and the plurality of new partial structures to produce new similar structures, and thereby the step of generating the similar structure generating the new similar structures of the sentence structure and setting the new similar structures as an equivalent class of the plurality of new partial structures.

12. A text mining method according to claim 11, further comprising:
a step of using the new similar structures as an equivalent class of the plurality of new partial structures on the generation source and detecting a frequent pattern.

13. A text mining method according to claim 11, further comprising:
a step of adjusting the operation so that a user determines how similar patterns are identical and detects the pattern.

14. A text mining method comprising:
a step of analyzing a document from a storage unit that stores a set of documents as a text mining object and obtaining a sentence structure representing a dependency among words;
a step of generating, from a user input, a first determination item for determining whether or not the structures are identical ones for every type of differences between sentence structures;
a step of generating, from a user input, a second determination item for determining whether or not the structures are identical ones for every type of differences between attribute values;
a step of performing predetermined modification operation of the partial structure of the sentence structure obtained by the analyzing unit and generating, using a computer, a similar structure having a similar meaning of the partial structure in accordance with the generated first determination item; and
a step of using the generated similar structure as an equivalent class of the partial structure on the generation source and detecting the pattern by ignoring the difference between the attribute values in accordance with the second determination item,
wherein the step of generating the similar structure comprises:
a step of performing parallel modification of the sentence structure when the first determination item determines the parallel modification, the parallel modification being structure modification including new branch generation for a particular one of nodes corresponding to the words put in a parallel relationship in the sentence structure so that the particular one is connected to each node connected by a branch from the node put in the parallel relationship for the particular one, said step of performing parallel modification of the sentence structure generating the similar structure;
a step of generating a plurality of new partial structures of the sentence structure from the partial structure and the similar structure;
a step of performing non-directional branching of a directional branch of the sentence structure and the plurality of new partial structures when the first determination item determines the non-directional branching of the directional branch to produce new similar structures;
a step of replacing a synonym of the sentence structure and the plurality of new partial structures by referring to a synonym dictionary when the first determination item determines the synonym replacement to produce new similar structures; and
a step of performing non-directional branching of ordering trees of the sentence structure and the plurality of new partial structures when the first determination item determines the non-directional branching of the ordering trees to produce new similar structures, and thereby the step of generating the similar structure generating the new similar structures of the sentence structure and setting the new similar structures as an equivalent class of the plurality of new partial structures.

15. A text mining method according to claim 14, wherein the step of obtaining the sentence structure generates the sentence structure containing a clause having a node and indicating at least a dependency as a directional branch from the node on a modifier to the node on a modifiee, and
the attribute value includes a surface case and/or the information about the attached word, added to the sentence structure.

16. A text mining method according to claim 14, wherein the frequent similar pattern is detected.

\* \* \* \* \*